(12) United States Patent
Smirnova et al.

(10) Patent No.: US 11,276,880 B2
(45) Date of Patent: Mar. 15, 2022

(54) SOLID-STATE ELECTROLYTES BASED ON LITHIUM HALIDES FOR ALL-SOLID-STATE LITHIUM-ION BATTERY OPERATING AT ELEVATED TEMPERATURES

(71) Applicant: South Dakota Board of Regents, Pierre, SD (US)

(72) Inventors: Alevtina Smirnova, Rapid City, SD (US); Matthew Dondelinger, Rapid City, SD (US); Joel Swanson, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 154 days.

(21) Appl. No.: 16/589,429

(22) Filed: Oct. 1, 2019

(65) Prior Publication Data
US 2020/0036038 A1  Jan. 30, 2020

Related U.S. Application Data

(63) Continuation-in-part of application No. 16/413,290, filed on May 15, 2019, now Pat. No. 10,991,976.

(60) Provisional application No. 62/672,445, filed on May 16, 2018.

(51) Int. Cl.
| | |
|---|---|
| *H01M 10/0562* | (2010.01) |
| *H01M 10/052* | (2010.01) |
| *H01M 4/66* | (2006.01) |
| *H01M 4/02* | (2006.01) |

(52) U.S. Cl.
CPC ..... *H01M 10/0562* (2013.01); *H01M 10/052* (2013.01); *H01M 4/661* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 7,083,877 | B2 | 8/2006 | Iwamoto et al. |
| 7,666,807 | B2 | 2/2010 | Heung et al. |
| 7,914,932 | B2 | 3/2011 | Yoshida et al. |
| 8,349,498 | B2 | 1/2013 | Oladeji |
| 8,535,725 | B2 | 9/2013 | Li et al. |
| 8,758,715 | B2 | 6/2014 | Wicks et al. |
| 9,246,188 | B2 | 1/2016 | Zhao et al. |

(Continued)

FOREIGN PATENT DOCUMENTS

| | | |
|---|---|---|
| WO | 2012112229 A2 | 8/2012 |

OTHER PUBLICATIONS

Braga et al., Novel Li3ClO based glasses with superionic properties for lithium batteries, Mar. 2014, J Mater Chem A, 5470-5480 (Year: 2014).

(Continued)

*Primary Examiner* — Daniel S Gatewood
(74) *Attorney, Agent, or Firm* — Goodhue, Coleman & Owens, P.C.

(57) ABSTRACT

The present disclosure relates to a manufacturing process of the solid-state glass-ceramic electrolytes, known in the art as antiperovskites. Specifically, the disclosure is focused on manufacturing of the solid-state electrolyte from the corresponding precursors directly on the active electrode surface of an electrochemical device, specifically anode or cathode of the lithium-ion or lithium metal batteries.

12 Claims, 18 Drawing Sheets

(56) References Cited

U.S. PATENT DOCUMENTS

| | | |
|---|---|---|
| 9,580,320 B2 | 2/2017 | Inda |
| 2010/0139320 A1 | 6/2010 | Schumacher et al. |
| 2015/0364788 A1 | 12/2015 | Lu et al. |
| 2018/0006306 A1 | 1/2018 | Zhu et al. |
| 2018/0277890 A1 | 9/2018 | Ueda et al. |

OTHER PUBLICATIONS

Lü, X., et al., "Antiperovskite Li3OCl Superionic Conductor Films for Solid-State Li-Ion Batteries". Advanced Science, 2016. 3(3), 5 pages.

Aguesse, F., et al., "Investigating the Dendritic Growth during Full Cell Cycling of Garnet Electrolyte in Direct Contact with Li Metal. ACS applied materials & interfaces", 2017. 9(4): p. 3808-3816.

Aurbach, D., et al., "A short review of failure mechanisms of lithium metal and lithiated graphite anodes in liquid electrolyte solutions". Solid state ionics, 2002. 148(3-4): pp. 405-416.

Bachman, J.C., et al., "Inorganic solid-state electrolytes for lithium batteries: mechanisms and properties governing ion conduction". Chemical reviews, 2015. 116(1): p. 140-162.

Chien, W.-m., D. Chandra, and J.H. "Lamb, X-ray diffraction studies of Li-based complex hydrides after pressure cycling". Adv. X-Ray Anal, 2008. 51: p. 190-195.

Debenedetti, P.G. and F.H. Stillinger, "Supercooled liquids and the glass transition". Nature, 2001.410(6825): p. 259-267.

Ganesh, P., P. Kent, and D.-e. Jiang, "Solid-electrolyte interphase formation and electrolyte reduction at Li-ion battery graphite anodes: Insights from first-principles molecular dynamics". The Journal of Physical Chemistry C, 2012. 116(46): p. 24476-24481.

Hanghofer, I., et al., "Untangling the Structure and Dynamics of Lithium-Rich Anti-Perovskites Envisaged as Solid Electrolytes for Batteries". Chemistry of Materials, 2018. 30(22): pp. 8134-8144.

Harada, Y., et al., "Lithium ion conductivity of polycrystalline perovskite La 0.67-x Li 3x TiO 3 with ordered and disordered arrangements of the A-site ions". Solid State Ionics, 1998. 108(1): Abstract, 2 pages.

Hartmann, P., et al., "Degradation of NASICON-type materials in contact with lithium metal: Formation of mixed conducting interphases (MCI) on solid electrolytes". The Journal of Physical Chemistry C, 2013. 117(41): p. 21064-21074.

Hitz, G.T., E.D. Wachsman, and V. Thangadurai, "Highly Li-Stuffed Garnet-Type Li7+ xLa3Zr2—xYxO12". Journal of The Electrochemical Society, 2013. 160(8): pp. A1248-A1255.

Hood, Z.D., et al., "Li2OHCl crystalline electrolyte for stable metallic lithium anodes". Journal of the American Chemical Society, 2016. 138(6): p. 1768-1771.

Huang, M., et al., "Effect of sintering temperature on structure and ionic conductivity of Li7—xLa3Zr2O12-0.5 x (x=0.5~ 0.7) ceramics". Solid State Ionics, Abstract, 2011. 204, 1 pages.

Inaguma, Y., et al., "High ionic conductivity in lithium lanthanum titanate". Solid State Communications, 1993. 86(10): Abstract, 1 page.

Kanno, R. and M. Murayama, "Lithium Ionic Conductor Thio-LISICON: The Li2 S GeS2 P 2 S 5 System". Journal of The Electrochemical Society, 2001. 148(7): Abstract, 1 page.

Kuhn, A., et al., "A new ultrafast superionic Li-conductor: ion dynamics in Li 11 Si 2 PS 12 and comparison with other tetragonal LGPS-type electrolytes". Physical Chemistry Chemical Physics, 2014. 16(28): p. 14669-14674.

Levi, M.D. and D. Aurbach, "The mechanism of lithium intercalation in graphite film electrodes in aprotic media. Part 1. High resolution slow scan rate cyclic voltammetric studies and modeling". Journal of Electroanalytical Chemistry, 1997. 421(1-2): Abstract, 1 page.

Momma, K. and F. Izumi, "Vesta 3 for three-dimensional visualization of crystal, volumetric and morphology data". Journal of applied crystallography, 2011. 44(6): Abstract, 1 page.

Ohta et al., Enhancement of the High-Rate Capability of Solid-State Lithium Batteries by Nanoscale Interfacial Modification. Advanced Materials 2006, 18: pp. 2226-2229.

Ohta, S., et al., "Co-sinterable lithium garnet-type oxide electrolyte with cathode for all-solid-state lithium ion battery". Journal of Power Sources, 2014. 265: Abstract (2 pages).

Richards, W.D., et al., "Interface stability in solid-state batteries". Chemistry of Materials, 2015. 28(1): p. 266-273.

Schweikert, N., et al., "Suppressed lithium dendrite growth in lithium batteries using ionic liquid electrolytes: Investigation by electrochemical impedance spectroscopy, scanning electron microscopy, and in situ 7Li nuclear magnetic resonance spectroscopy". Journal of Power Sources, 2013. 228: Abstract (2 pages).

Stegmaier, S., et al., "Li+ defects in a solid-state Li ion battery: theoretical insights with a Li3OCl electrolyte". Chemistry of Materials, 2017, pp. 4330-4340.

Takada, K., et al., "Interfacial phenomena in solid-state lithium battery with sulfide solid electrolyte". Solid State Ionics, 2012. 225: Abstract, 1 page.

Truong, L., et al., "Facile proton conduction in H+/Li+ ion-exchanged garnet-type fast Li-ion conducting Li 5 La 3 Nb 2 O 12". Journal of Materials Chemistry A, 2013. 1(43): pp. 13469-13475.

Truong, L., J. Colter, and V. Thangadurai, "Chemical stability of Li-stuffed garnet-type Li 5+ x BaxLa 3-x Ta 2 O 12 (x=0, 0.5, 1) in water: a comparative analysis with the Nb analogue". Solid State Ionics, 2013. 247: Abstract, 2 pages.

Wang, H., et al., "Mn3O4-graphene hybrid as a high-capacity anode material for lithium ion batteries". Journal of the American Chemical Society, 2010. 132(40): p. 13978-13980.

Xu, K., "Nonaqueous liquid electrolytes for lithium-based rechargeable batteries". Chemical reviews, 2004. 104(10): p. 4303-4417.

Yang, H., G.V. Zhuang, and P.N. Ross, "Thermal stability of LiPF 6 salt and Li-ion battery electrolytes containing LiPF 6". Journal of Power Sources, 2006. 161(1): p. 573-579.

Ye, M., et al., "A respiration-detective graphene oxide/lithium battery". Journal of Materials Chemistry A, 2016. 4(48): Abstract, 1 page.

Zhang, J., et al., "High pressure-high temperature synthesis of lithium-rich Li 3 O (Cl, Br) and Li 3-x Ca x/2 OCl anti-perovskite halides". Inorganic Chemistry Communications, 2014. 48: p. 140-143.

Zhang, S., K. Xu, and T. Jow, "EIS study on the formation of solid electrolyte interface in Li-ion battery". Electrochimica acta, 2006. 51(8): Abstract, 1 page.

Zhao, Y. and L.L. Daemen, "Superionic conductivity in lithium-rich anti-perovskites". Journal of the American Chemical Society, 2012. 134(36): p. 15042-15047.

Zhu, X., et al., "First principle calculation of lithiation/delithiation voltage in Li-ion battery materials". Chinese Science Bulletin, 2011. 56(30): p. 3229-3232.

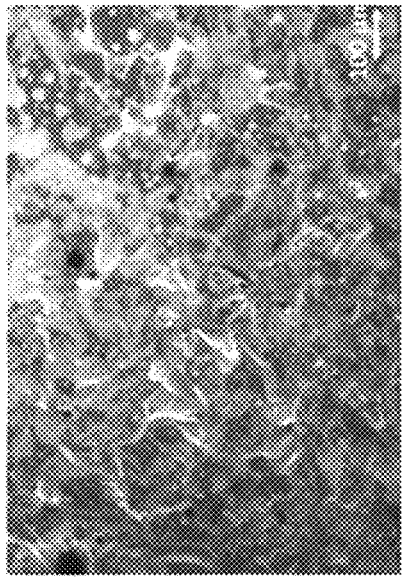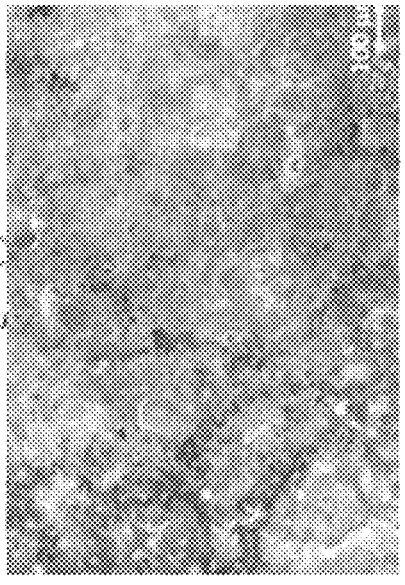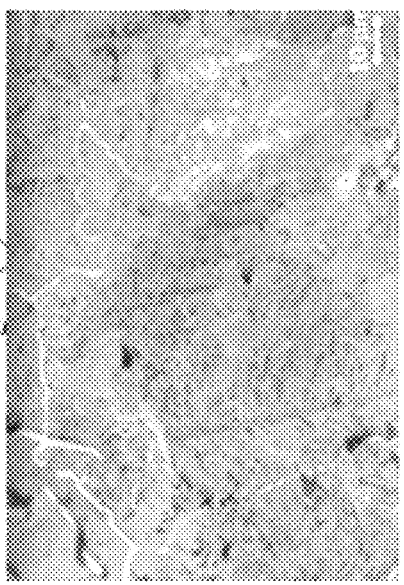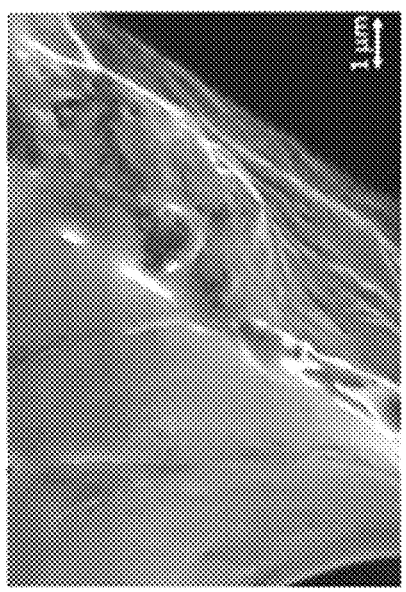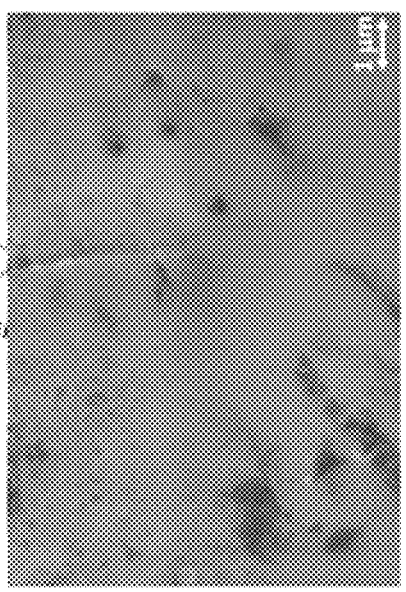
FIG. 3(a-f)

SOLID-STATE ELECTROLYTES BASED ON LITHIUM HALIDES FOR ALL-SOLID-STATE LITHIUM-ION BATTERY OPERATING AT ELEVATED TEMPERATURES

PRIORITY STATEMENT

This application is a continuation-in-part of and claims priority to U.S. patent application Ser. No. 16/413,290 filed on May 15, 2019, which claims priority to U.S. Provisional Patent Application No. 62/672,445 filed on May 16, 2018 both of which are titled Solid-State Electrolytes Based on Lithium Halides for All-Solid-State Lithium-ion Battery Operating at Elevated Temperatures, all of which are hereby incorporated by reference in their entireties.

GOVERNMENT SUPPORT CLAUSE

This disclosure was made with government support under NNX14AN22A and N68335-17-C-0016 awarded by National Aeronautics and Space Administration (NASA). The United States government has certain rights in the disclosure.

FIELD OF THE DISCLOSURE

The present disclosure relates to a manufacturing process of the solid-state glass-ceramic electrolytes, known in the art as antiperovskites. Specifically, the disclosure is focused on manufacturing of the solid-state electrolyte from the corresponding precursors directly on the active electrode surface of an electrochemical device, specifically anode or cathode of the lithium-ion or lithium metal batteries.

TECHNICAL BACKGROUND

The state-of-the-art lithium-ion batteries demonstrate high energy density, relatively low rate of self-discharge, and low maintenance. However, these batteries experience performance deterioration and formation of solid electrolyte interface (SEI) layers that limit mass transport and lithium-ion conductivity when cycled for extended periods of time [1]. Furthermore, liquid electrolytes, such as conventional $LiPF_6$-based electrolytes in organic solvents [2] are flammable and corrosive [3]. Because of their narrow electrochemical stability window, liquid electrolytes do not allow the use of high voltage cathodes. Additionally, liquid electrolytes cannot be used with high capacity lithium metal anodes due to dendrite formation [4].

A number of patents and patent applications disclose the manufacturing processes of the solid-state electrolytes and the batteries made with sold-state electrolytes; among them the batteries made with such solid-state electrolytes as nitrogen-doped $LiPO_4$ and its derivatives: $0.63Li_2S$-$0.36SiS_2$-$0.01Li_3PO_4$ (U.S. Pat. No. 7,083,877, 2006)[5], $Li_{1.3}Al_{0.3}Ti_{1.7}(PO_4)_3$ (U.S. Pat. No. 7,914,932, 2011) [6], $Li_{1+x+y}(Al,Ga)_x(Ti,Ge)_{2-x}Si_yP_{3-y}O_{12}$ (U.S. Pat. No. 9,580,320, 2017) [7]. Another group of solid-state electrolytes, specifically garnets (U.S. patent application Ser. No. 15/730,097 [8]), are not economically feasible because of their electrochemical deterioration or prohibitive cost that exceeds the cost of the disclosed glass ceramic materials by over two orders of magnitude. Additional disadvantages of many ceramic materials is high melting point and grain boundary effects that make their application challenging, especially regarding their economic feasibility.

A broad spectrum of metal oxides, phosphates and sulfides have been tested as solid-state electrolytes for lithium-ion batteries. The primary advantage of oxides is their low charge transfer resistance at the electrolyte-electrode interface [9]. Furthermore, metal oxides, such as $Li_{7+x}La_3Zr_{2-x}Y_xO_{12}$ [10], $Li_5La_3Nb_2O_{12}$[11], $Li_{5+x}Ba_xLa_{3-x}Ta_2O_{12}$ [12], have low ionic conductivity ($\leq 10^{-4}$ S/cm).

Compared to metal oxides, phosphate- or sulfide-based lithium superionic conductors (LISICONs), such as $Li_{1+x-y}Al_x^{3+}M_y^{5+}M^{4+}_{2-x-y}(PO_4)_3$ (where M=Ge; M=Ti, Ge; and M=Ti, Ta) have slightly higher conductivity ($\sim 4 \cdot 10^{-4}$ S·$cm^{-1}$) than metal oxides. Perovskite structure superfast solid-state ionic conductor $Li_{3x}La_{2/3-x}TiO_3$ [13] has even higher lithium-ion bulk conductivity ($\sim 1.5 \cdot 10^{-3}$ S/cm [14]), but has elevated grain boundary resistances. Among LISICONs, sulfides (e.g. $Li_{10}GeP_2S_{12}$) have a theoretical ionic conductivity greater than that of the current liquid $LiPF_6$-based electrolyte at room temperature ($\sim 10^{-2}$ S/cm) [15]. However, sulfides form interfacial layers with poor ionic conductivity [16, 17]. As a silicon-based analogue of $Li_{10}GeP_2S_{12}$, $Li_{11}Si_2PS_{12}$ exhibits high performance and lower activation energy (0.20 eV) due to nearly isotropic lithium ion hopping in the crystalline lattice, but it is not chemically stable [18]. Furthermore, LISICONs in contact with lithium metal form low-conducting interphases [19] that make them less desirable in solid-state battery applications.

In comparison to oxides and sulfides, lithium-based antiperovskites with a general formula $Li_{3-x}M_{3x}C_{1-y}C_y'A_{1-z}A'_z$, possess the highest ionic conductivity (e.g. $\sim 1.94 \times 10^{-3}$ S·$cm^{-1}$ for $Li_3OCl_{0.5}Br_{0.5}$ [20]) comparable to liquid electrolytes at room temperature [16]. Further tuning of the $Li^+$ hopping mechanism for optimized ionic transport can be achieved by A-mixing, M/H-doping, or LiA-depletion. The charge and size of M, C, and A atoms permits to tune $Li^+$ ionic conductivity through "vacancy-enhancement" and "distortion-control" of the crystal lattice.

Additional advantages of antiperovskites are their large electrochemical window and low grain boundary effects due to their glass-ceramic nature [20, 21]. It was demonstrated that mixed halides, e.g. $Li_3O(Cl,Br)$, have higher conductivity than $Li_3OBr$ or $Li_3OCl$ [20]. In the case of $Li_3OBr$, lower ionic conductivity was explained by the large size of Br anions on dodecahedral A-sites leaving little space for $Li^+$ cations to hop into the interstitial spaces. In the case of $Li_3OCl$, $Cl^-$ anions are assumed to distort the crystal structure by octahedral tilting leading to the partial collapse of A sites and the formation of low-symmetry phases with low ionic conductivity.

In contrast to $Li_3O(Cl,Br)$ [20], partial substitution of lithium atoms by hydrogen atoms in $Li_3ClO$ structure resulting in the $Li_2HOCl$ composition tested at 50-200° C. by Hood et al. (2016) [22] demonstrated significant crystal phase transformation and change in Arrhenius slope at temperatures below 50° C. which does not meet the requirements of a solid-state electrolyte. The electrolyte crystal phase was stable only at higher temperatures (50-200° C.) [22], but revealed relatively high activation energy of 0.56 eV.

Known in the art, is the phenomenon when the electric conductivity of the solid-state glass-ceramic electrolytes is affected by the cooling rate causing crystal growth and changes in crystal structure and morphology. For example, in case of $Li_2OHCl$ [28], slow cooling from 350 to 250° C. at 8° C./h produced antiperovskite crystal structure, while fast cooling from ≥350° C. to room temperature resulted in less electrically conductive crystal structures due to overcooling.

Known in the art, is a phenomenon when solid-state electrolyte interfaces (SEIs) are formed in electrochemical cells, such as lithium-ion batteries. In some cases, for example in batteries with carbon-based anodes, they perform a positive role. However, SEIs can also cause detrimental effects and battery failure due to their low electric conductivity, such as in case of silicon-based anodes. In case of solid-state electrolytes in contact with anodes or cathodes, this effect is not well investigated and understood. An example of SEI formation is presented at the cross section of the lithium metal and $Li_2OHCl$ for a symmetric $Li/Li_2OHCl/Li$ cell with molten lithium anode tested for 160 cycles at 195° C. [28].

Lithium dendrites, that form within an electrochemical lithium-ion cell, present a significant battery safety challenge due to increased battery flammability. In case of solid-state electrolytes, lithium dendrite formation was earlier detected along the grain boundaries in garnets [23, 24].

A few synthesis methods for the glass-ceramic antiperovskites with a general formula $Li_{3-x}M_xC_{1-y}C_y'A_{1-z}A_z'$ are known in the art. The patent WO 2012112229 [25] describes a multi-step process for synthesis of a lithium halide from an aqueous solution containing dissolved precursors. The disclosed steps of the said synthesis include preparation of aqueous solution of inorganic precursors, evaporation of water to produce solids, and a heat-treatment step of the solids in vacuum for at least 48 hr to produce lithium halides. This approach does not meet the requirement for cost-effectiveness and technological viability due to lengthy and complicated procedure.

Known in the art, is a solid-state electrolyte synthesis via spray-deposition of the aqueous solutions containing dissolved inorganic chemicals on a heated substrate, preferably at 100 to 400° C. (U.S. Pat. No. 8,349,498 B2, 2013) [43]. However, this disclosure includes a number of solid-state electrolyte, such as $Li_xAl_{z-y}Ga_yS_w(PO_4)_c$, $Li_xAl_{z-y}Ga_yS_w(BO_3)_c$, $Li_xGe_{z-y}Si_yS_w(PO_4)_c$, and $Li_xGe_{(z-y)}Si_yS_w(BO_3)_c$, but does not disclose glass-ceramic antiperovskites.

The U.S. Pat. No. 10,044,061 B2 (2018) [26] describes a process of pulsed laser beam or sputtering for preparing antiperovskite $Li_3OCl$ electrolyte films by using a composite target manufactured from $Li_3OCl$ inorganic precursors, such as lithium metal oxide and metal halide. The patent (U.S. Ser. No. 15/545,000. 2018)[27] describes lithium-rich antiperovskites for cathode applications. Both patents are not directly related to the present disclosure.

The U.S. Pat. No. 9,246,188 B2 by Zhao et al. [28] describes antiperovskite electrode compositions that may be prepared by sintering of various solid precursors at elevated pressures and temperatures. The patent does not reveal the claimed electrochemical properties of the solid-state electrolytes in an electrochemical setup.

Claimed in [22] and the U.S. Pat. No. 8,349,498 (2013) [29], a simple mixing of inorganic precursors at temperatures <400° C. in argon produced dense membranes, composed for example of $Li_2HOCl$. The controlled cooling from 350 to 250° C. at 8° C./h yielded anti-perovskite structures (termed "slow-cooled"), while fast cooling from ≥350° C. to room temperature in ~20 min (termed "fast-cooled") produced more complex crystal structures with increased defects due to the overcooling effect. However, the compounds were found to undergo a phase transition between 30 and 50° C. that is unacceptable for the lithium-ion battery operating in a broad temperature range up to 100° C. Furthermore, the porosity of the said electrolytes exceeded 20 vol. % that is considered as a significant drawback.

Based on the examples and references presented above, it can be concluded that none of the prior art techniques describe the disclosed in this disclosure manufacturing process of the solid-state glass-ceramic electrolytes, known in the art as antiperovskites, directly on the active battery electrode surfaces followed by compression of the electrolyte onto the said surface and fast cooling that produce functional electrochemical cells with improved long-term electrochemical properties and durability at elevated temperatures.

SUMMARY

The present disclosure relates to a method of manufacturing the solid-state electrolyte layers on the surface of an active electrode by direct contact of the said electrode with the melted electrolyte at temperatures above or close to the melting point of the electrolyte.

The present disclosure relates to a method of manufacturing solid-state electrolyte layers directly on the active electrode surfaces, specifically on the surface of anode or cathode, by direct contact of the said electrodes with the electrolyte at temperatures above or close to its melting point.

According to one specific embodiment, the said manufacturing method comprises a step when a representative solid-state electrolyte from the class of lithium undoped or doped antiperovskites and their polymorphs [33] with a general formula $Li_{3-x}M_xC_{1-y}C_y'A_{1-z}A_z'$, where M is hydrogen, or a metal from the first three groups of the periodic table of elements and x is defined by the charge of the corresponding metal, C and C' are chalcogens (O, S, Se), and A and A' are halogens (F, Cl, Br, I), or ions, such as $BH_4^+$ or $BF_4^+$, can be applied.

The present disclosure relates to a group of the said electrically conductive and cost-effective solid-state materials and their nanocomposites that have relatively low melting point temperatures, specifically in the range from 250° C. and up to 600° C. that allows to apply an economically feasible method described in this disclosure.

According to one specific embodiment, the proposed disclosure describes the method that eliminates grain boundary formation in the said solid-state electrolyte layers directly deposited on the electrode surface due to the applied process of fast cooling. Absence of grain boundaries within the electrolyte layer produced by the said method improves the electric conductivity and the lithium-ion transport in the said solid-state electrolyte.

According to one specific embodiment, the proposed disclosure describes the method that produces solid-state electrolyte layers that do not undergo phase transformations within the operation temperature range in the range of −20° C. −100° C. Absence of phase transformations within the solid-state electrolyte ensures high lithium-ion transport within the said operation temperature range of the operational electrochemical device.

According to one specific embodiment, the proposed disclosure describes the method that produces solid-state electrolyte layers on the electrode surface, after a compression force is applied to the electrode located on top of the melted solid-state electrolyte.

According to one specific embodiment, the proposed disclosure describes the method that produces solid-state electrolyte layers on the active electrode surface, and specifically anode or cathode electrode surface, after a compression force is applied. This method results in intimate contact and minimized interfacial resistance between the said electrolyte and the electrodes.

According to one specific embodiment, the present disclosure is related to the disclosed disclosure related to the class of lithium undoped and doped antiperovskites and their polymorphs that are produced in a moisture-free environment, such as those containing different inert or noble gases, including but not limited to helium, argon, or nitrogen, or vacuum.

According to one specific embodiment, the present disclosure is related to a manufacturing process involving a class of lithium undoped and doped antiperovskites and their polymorphs that after melting in a moisture-free environment, can be brought in direct contact with the active anode or cathode electrode surface due low meting point of the said electrolytes.

According to one specific embodiment, the present disclosure is related to the manufacturing process involving a class of lithium undoped and doped antiperovskites and their polymorphs that can be brought in direct contact with the active anode or cathode electrode surface and compressed by using a metal with low adhesion toward the said electrode, preferably nickel foil.

The present disclosure relates to a said group of electrically conductive and cost-effective solid-state materials and their nanocomposites, formed by the direct exposure of the battery electrodes to the melted electrolyte with addition of polymer-based, inorganic, or organic materials for mechanical electrolyte phase integrity with a specific feature of chemical, electrochemical, and crystal phase stability at elevated temperatures, and more specifically from room temperature (RT) and up to at least 100° C.

Different from other disclosures in the field, the present disclosure relates to the electrically conducting solid-state antiperovskite electrolytes produced in the said way that do not form interfacial phases in contact with lithium metal anodes. These low conducting interfacial phases known in the art as Solid Electrolyte Interface (SEI) layers have not been detected for the solid-state electrolyte layers formed on the active electrode surface using the method disclosed in this disclosure.

Different from other disclosures in the field, the present disclosure relates to the electrically conducting solid-state electrolytes with antiperovskite crystal structures that are produced in a moisture-free environment on the active positive or negative battery electrode surface or both and the performance of the battery made in the said way.

Different from other disclosures in the field, the present disclosure relates to the electrically conducting solid-state electrolytes with antiperovskite crystal structures that are produced in a moisture-free environment on the active positive or negative battery electrode surface or both and the performance of the battery made in the said way at elevated temperatures.

The applications of the present disclosure described in this disclosure are relevant but are not limited to the electrochemical energy generation and storage devices and specifically the electrode materials of the said devices; among them batteries, die-sensitized solar cells, fuel cells, supercapacitors, or combination thereof. Yet other application areas may also include touchscreens, organic light-emitting diodes, flexible organic solar cells, and organic electrochemical transistors. Furthermore, the disclosed solid-state electrolyte can be used in hole-injecting transparent plastic and flexible electrodes for polymer light emitting diodes, field-effect transistors, and photovoltaic cells.

While conventional techniques use the expensive precursors and high-temperature synthesis for manufacturing of the solid-state electrolytes, the disclosed disclosure is related to the antiperovskite-based materials with a general formula $Li_{3-x}M_{3x}C_{1-y}C_y'A_{1-z}A'_z$. where M is H, alkali, or alkali earth metal, C and C' are chalcogens (O, S, Se), and A and A' are halogens (F, Cl, Br, I) or ions, such as $BH_4^+$ or $BF_4^+$. The disclosure is specifically focused on a process of an electrolyte or an electrolyte-based nanocomposite manufacturing in a moisture-free environment that possess constant crystal structure within the entire range of operation temperatures (−20° C.-100° C.) and do not produce additional solid-state phases, such as those detected earlier along the grain boundaries in garnets [23, 24]. Specifically, a process of an electrolyte or an electrolyte-based nanocomposite manufacturing process in a moisture-free environment resulting in an electrochemically stable, highly conductive electrolyte in absence of the phase transformations in a broad temperature range produced by the said method is disclosed.

The present disclosure demonstrates a manufacturing process of an solid-state electrolyte layer by the said method resulting in an improved electrode-electrolyte interface due to the direct contact with melted electrolyte in a moisture-free controlled environment favorable for solid-state lithium-ion batteries operating in a broad temperature range and at least up to 100° C. by utilizing the melting point value of the antiperovskite, e.g. lithium halide (~282° C.)[20]. The embodiments disclosed herein, successfully tested the manufacturing process of the solid-state glass-ceramic electrolytes, known in the art as antiperovskites, directly on the active either positive or negative battery electrode surface, followed by compression of the electrolyte onto the said surface and fast cooling, that results in improved long-term electrochemical durability observed in contact with lithium metal at the elevated temperatures. These embodiments validate, that the said solid-state electrolyte-electrode interfaces can be produced on the surface of metal, e.g. nickel foil, resulting in a grain-free electrolyte morphology and long-term electrochemical stability of the electrolyte in contact with lithium metal.

BRIEF DESCRIPTION OF THE DRAWINGS

Illustrated embodiments of the disclosure are described in detail below with reference to the attached drawing figures, which are incorporated in reference herein, and where.

1. Metal foil, preferably nickel foil;
2. Electrolyte melted on the surface of the metal foil;
3. Copper-supported anode or aluminum-supported cathode;
4. Ni foil peeled off from the electrolyte surface after compression;
5. Copper-supported anode with attached layer of the solid-state electrolyte in intimate contact with the anode active, e.g. graphite or silicon-based composite layer.

Figure 1:
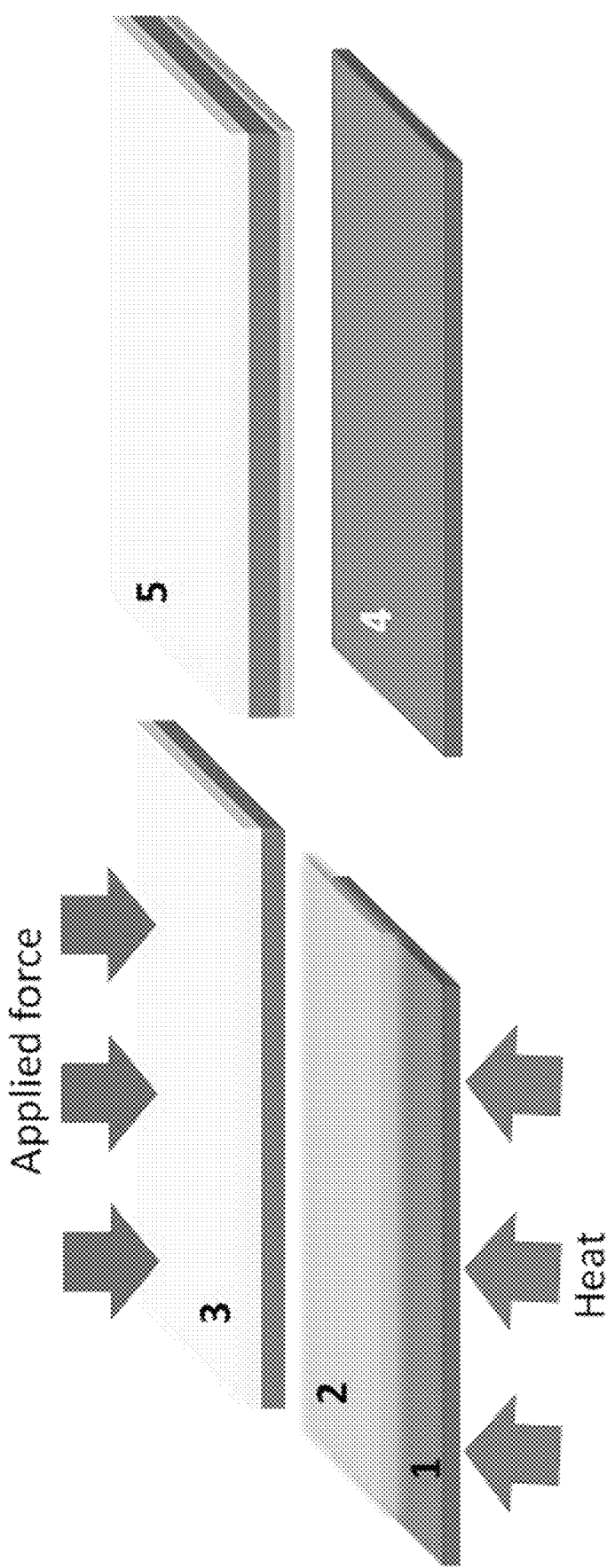
FIG. 1 is a pictorial representation of a drawing explaining the manufacturing process of the solid-state glass-ceramic electrolyte, known in the art as antiperovskites, directly on the active either positive or negative battery electrode surface, followed by compression of the electrolyte onto the said surface and fast cooling, that results in enhanced long-term electrochemical performance and durability observed in contact with lithium metal at the elevated temperatures.
Figure 2:
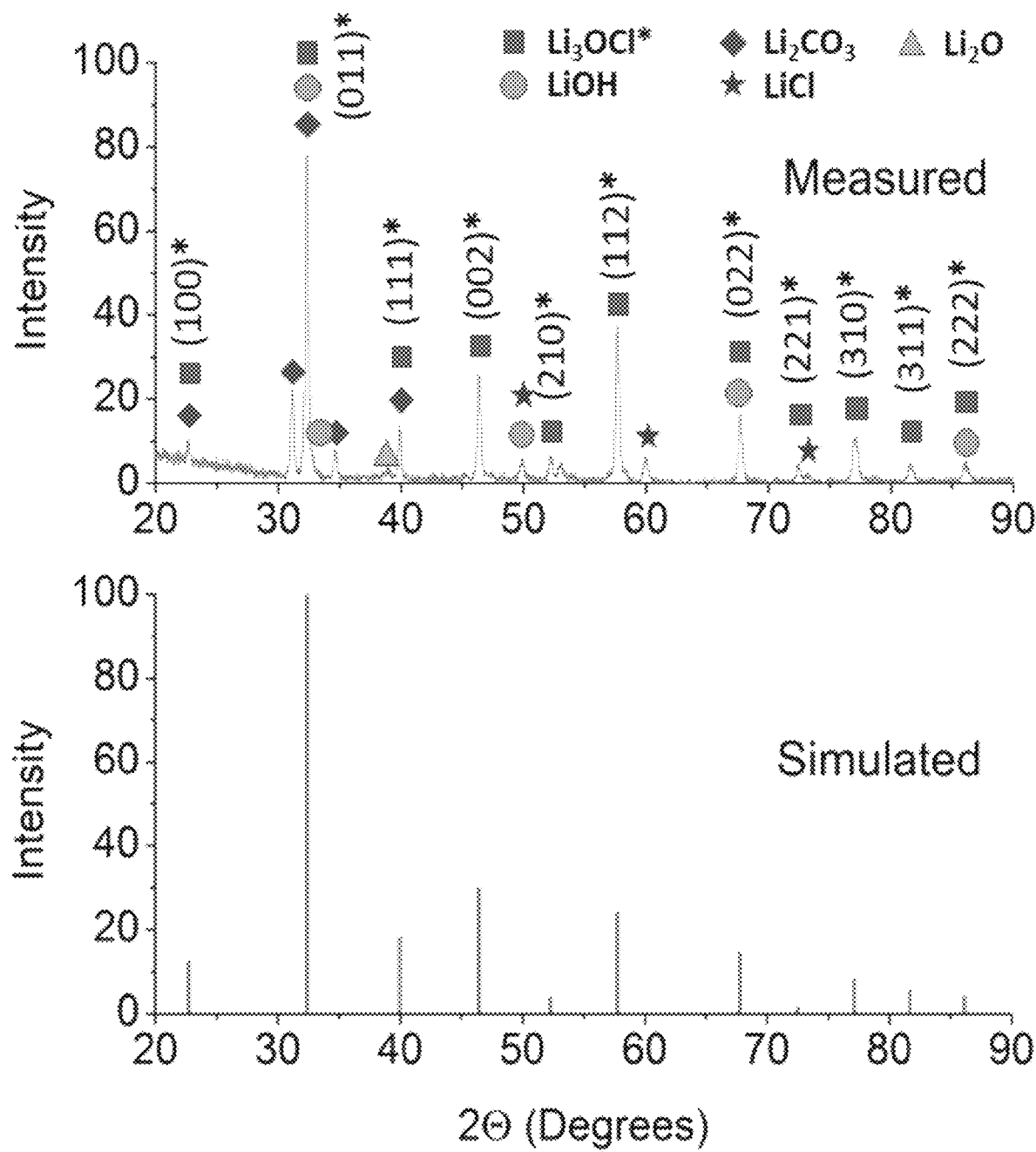

FIG. 2 is a pictorial representation of an experimental and simulated XRD spectra of $Li_3OCl$ electrolyte deposited directly on the surface of the lithium-ion battery anode with the corresponding Miller indices along with the detected admixture peaks of LiOH [30-32], $Li_2O$ [31, 32], $Li_2CO_3$ [30], and LiCl [32].

FIGS. 3A-3F are a set of the SEM images of the $Li_3OCl$ electrolyte deposited directly on the nickel foil without compression (a-c) and after compression (d-f) at 100, 1000, and 10000 magnification.

Figure 4A:
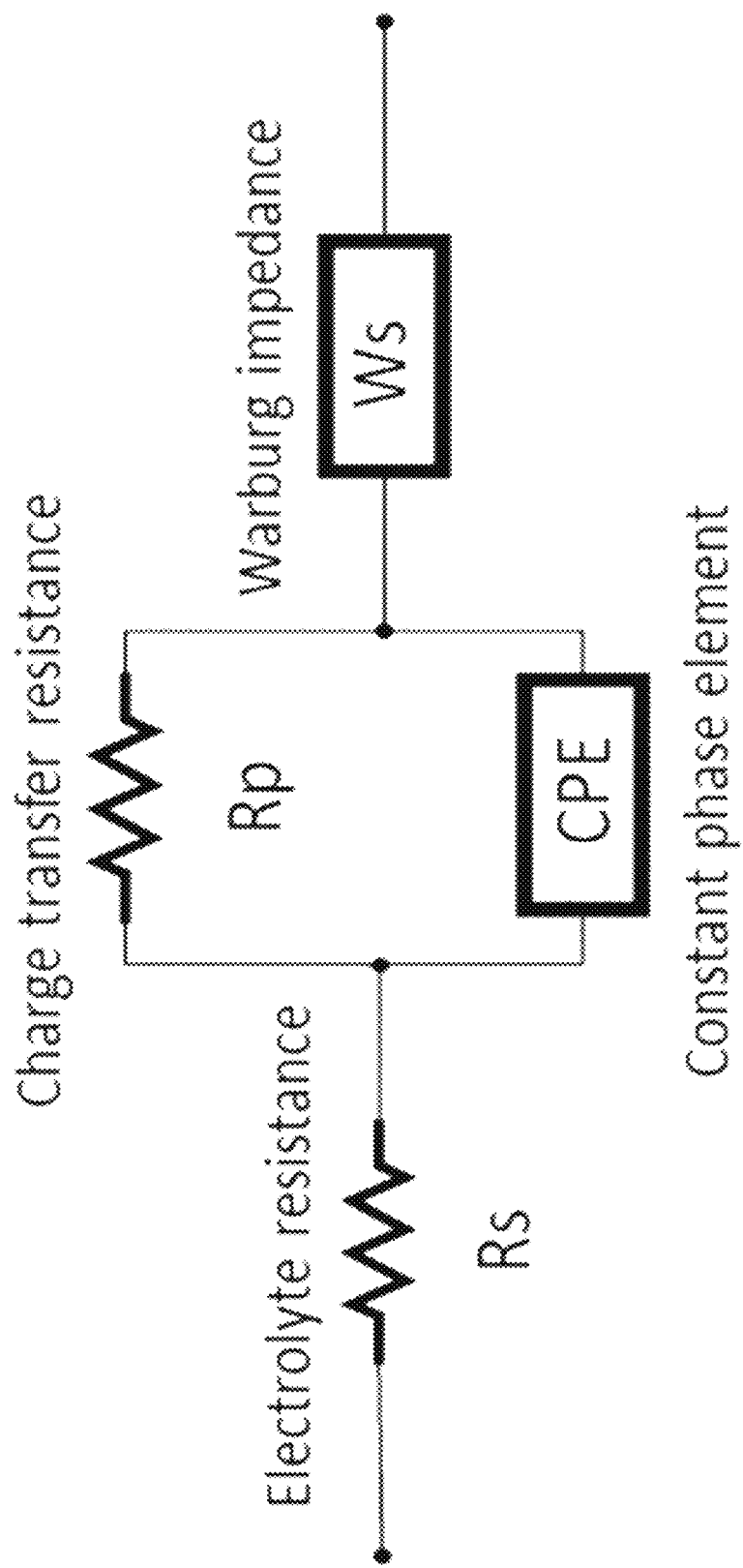
Figure 4B:
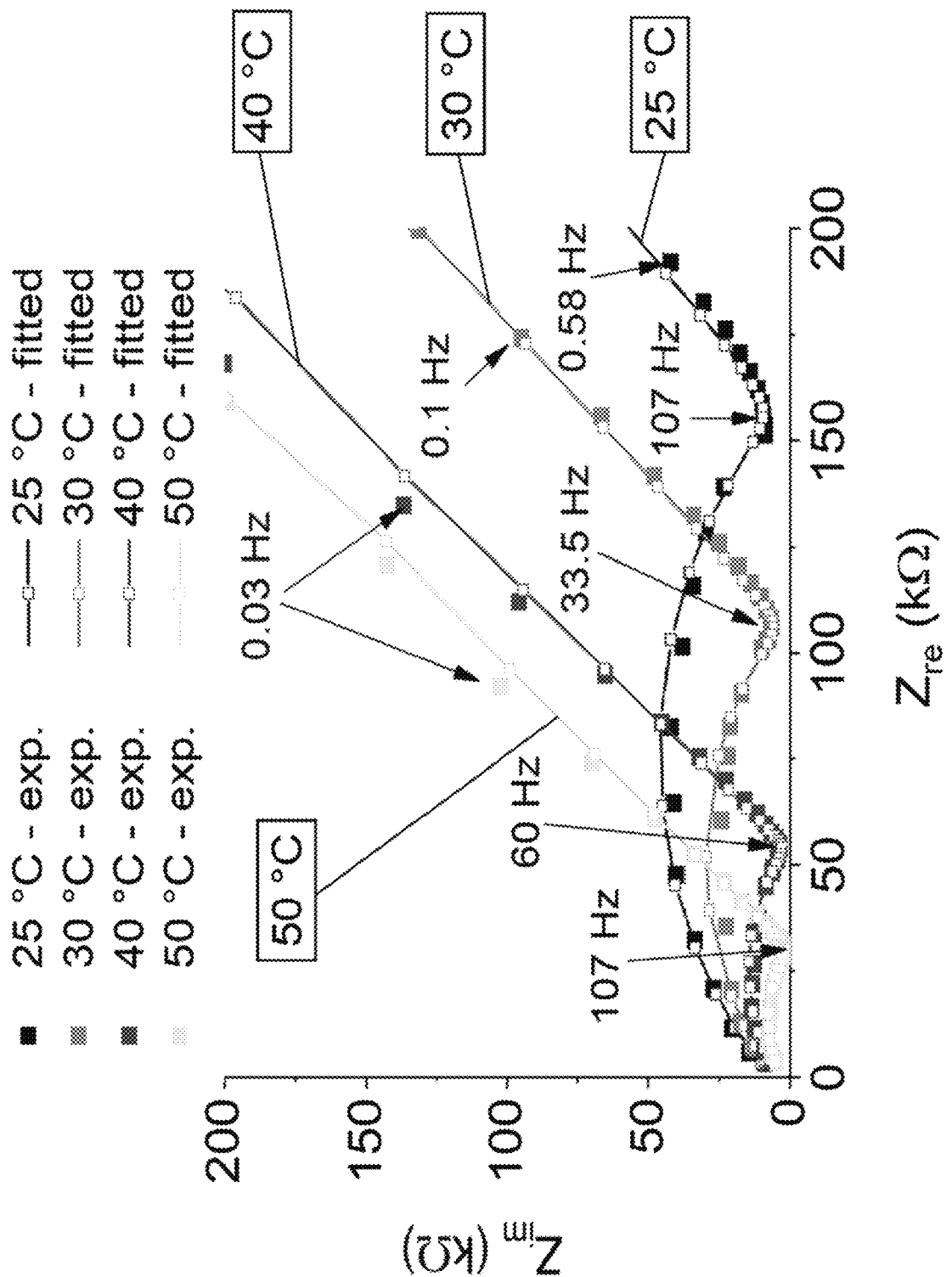
Figure 4C:
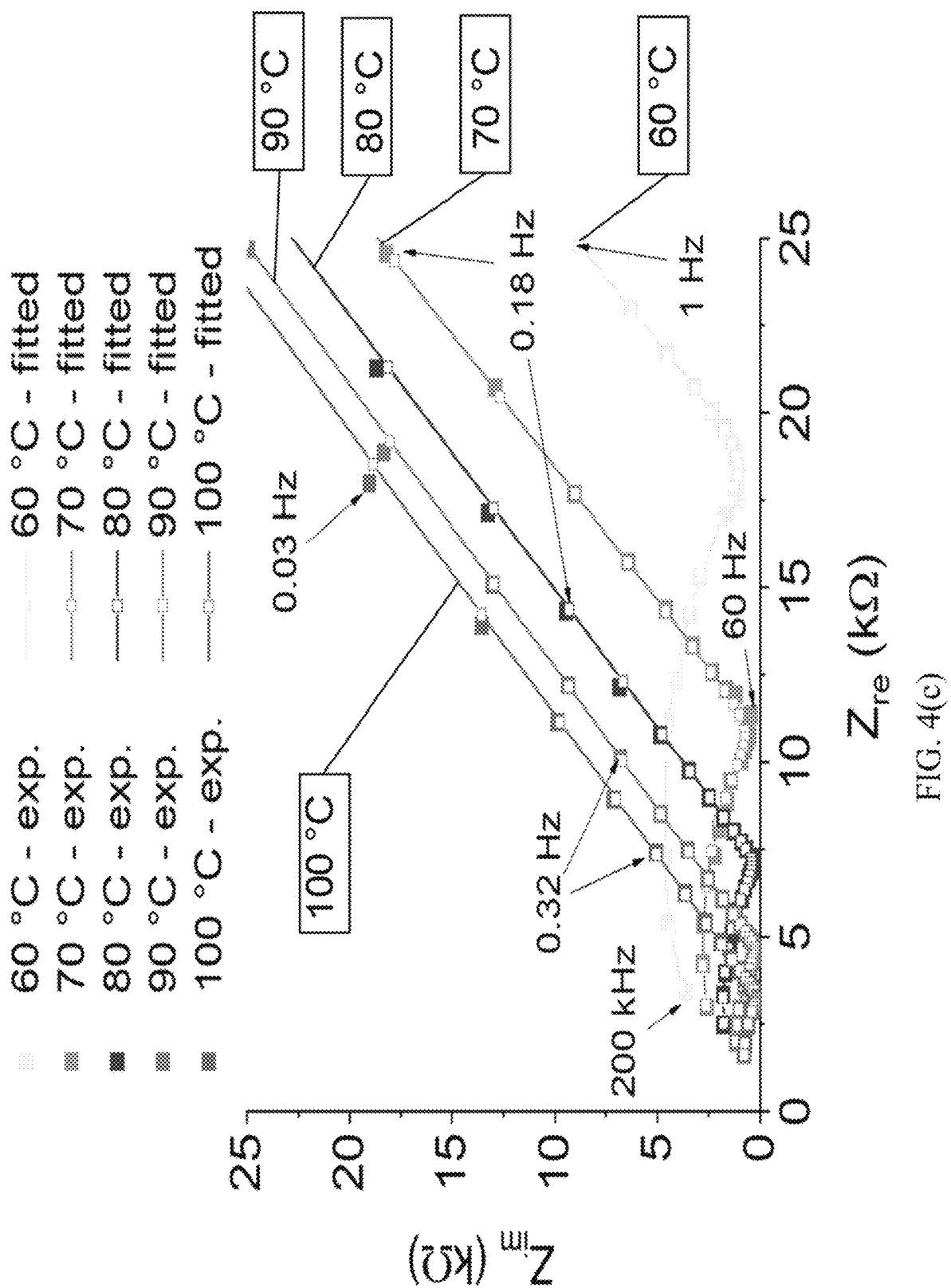

FIGS. 4A-4C are a pictorial representation of (a) An equivalent circuit for CR2025 half-cells with $Li_3OCl$ solid-state electrolyte, graphite working electrode, and lithium metal as a reference. AC Impedance spectra of $Li_3OCl$ half-cells at variable temperatures from 25° C. to 60° C. (b) and 70° C. to 100° C. (c). The frequency range is from 200 kHz to 0.01 Hz with a total of 30 points spaced logarithmically. The symbols and the lines represent the experimental and the fitting data, respectively.

Figure 5:
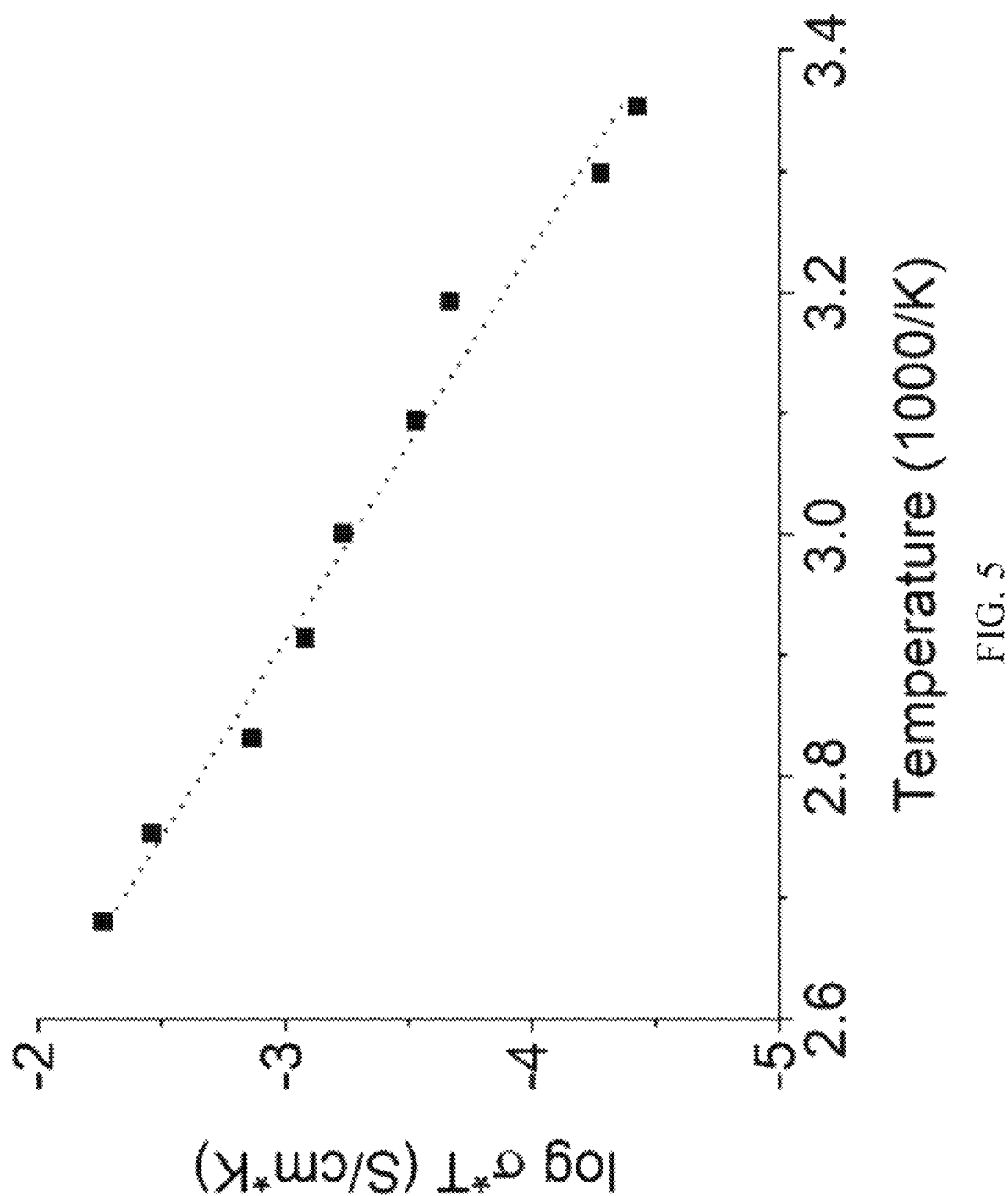

FIG. 5 is a pictorial representation of Arrhenius plot for $Li_3OCl$ solid-state electrolyte derived from the AC Impedance data.

Figure 6:
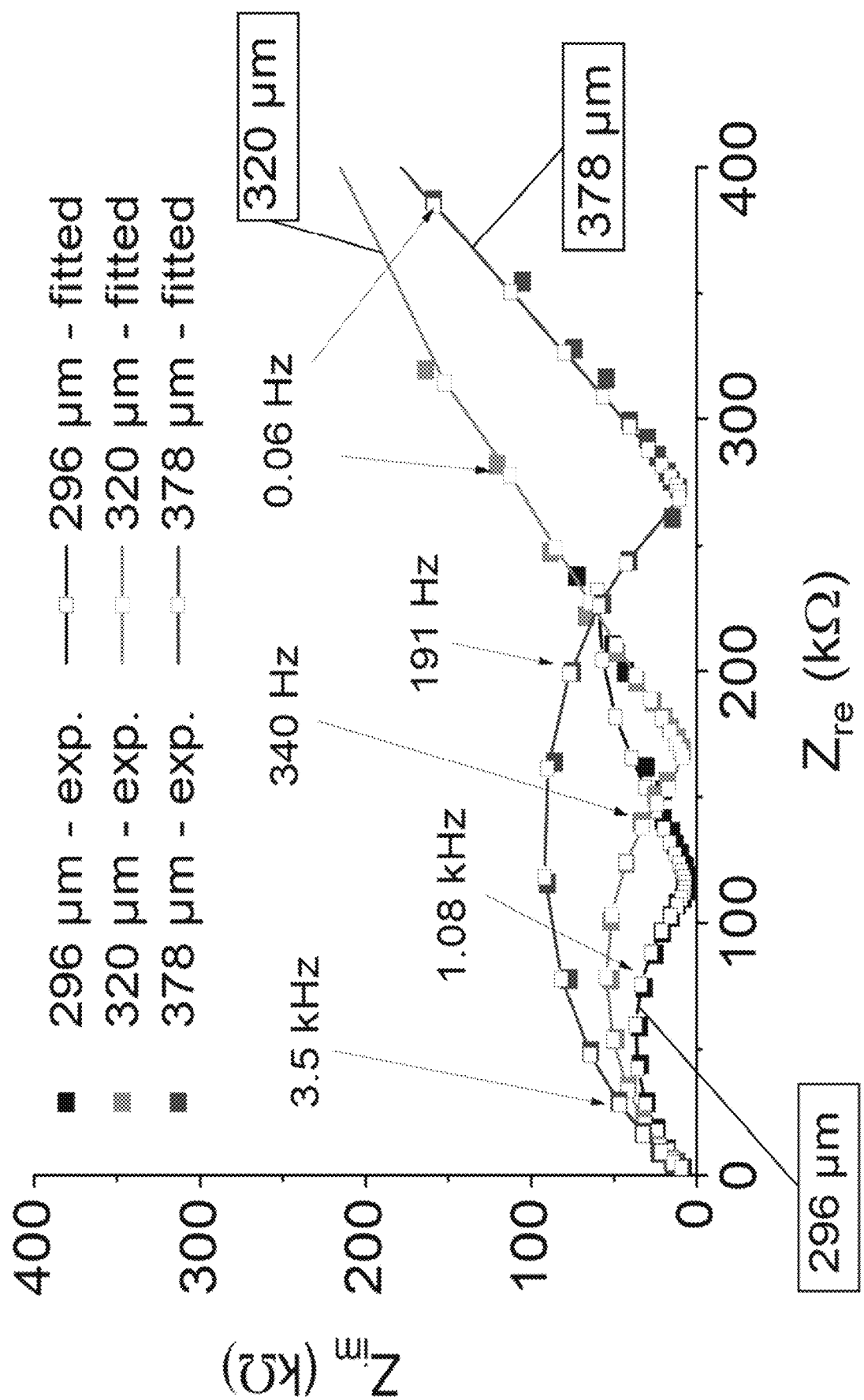

FIG. 6 is a pictorial representation of the AC Impedance spectra measured at room temperature for the electrochemical half-cells with $Li_3OCl$ solid-state electrolyte membrane having variable membrane thicknesses. The symbols and the lines represent the experimental and the fitting data, respectively.

Figure 7A:
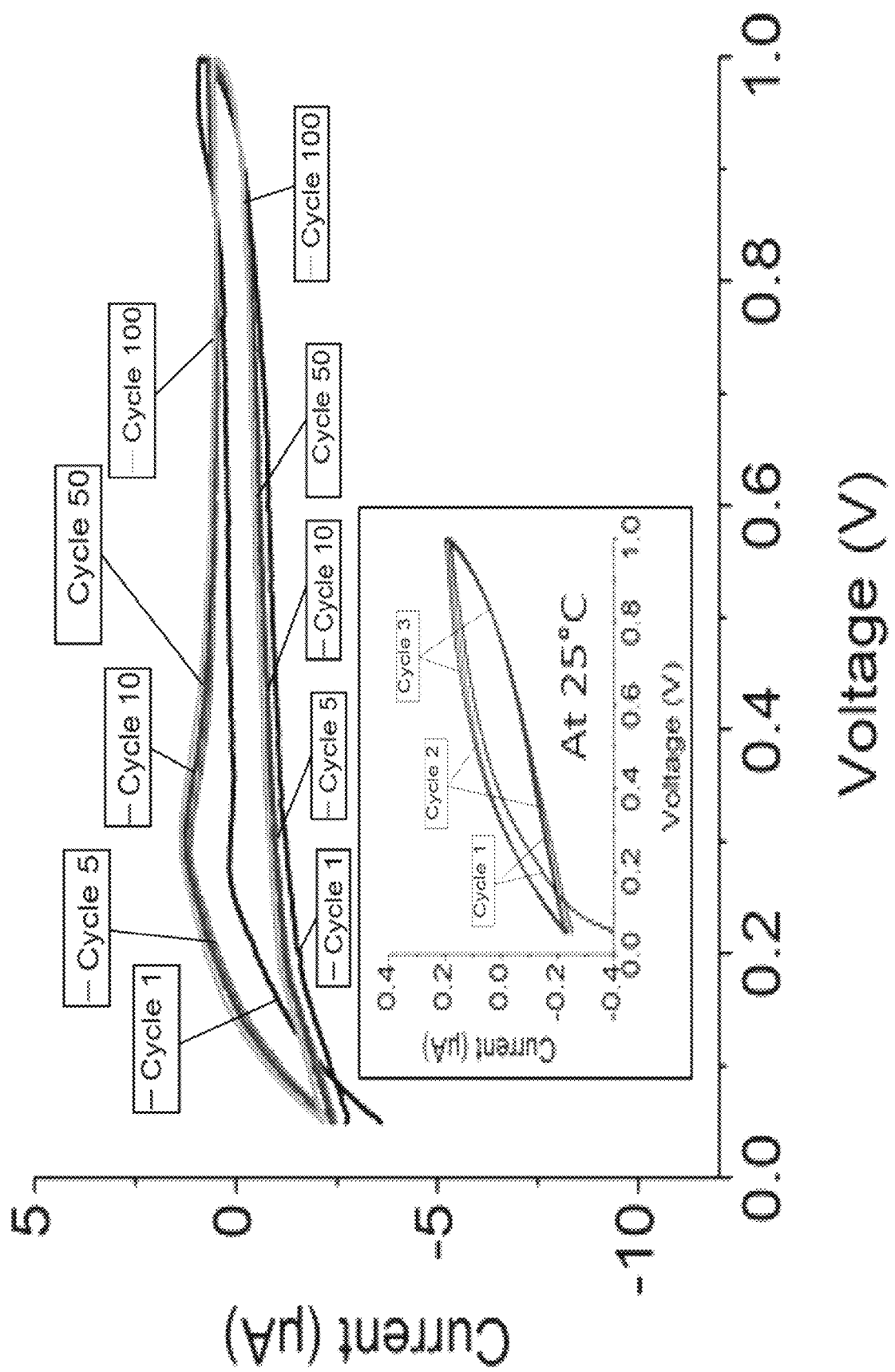
Figure 7B:
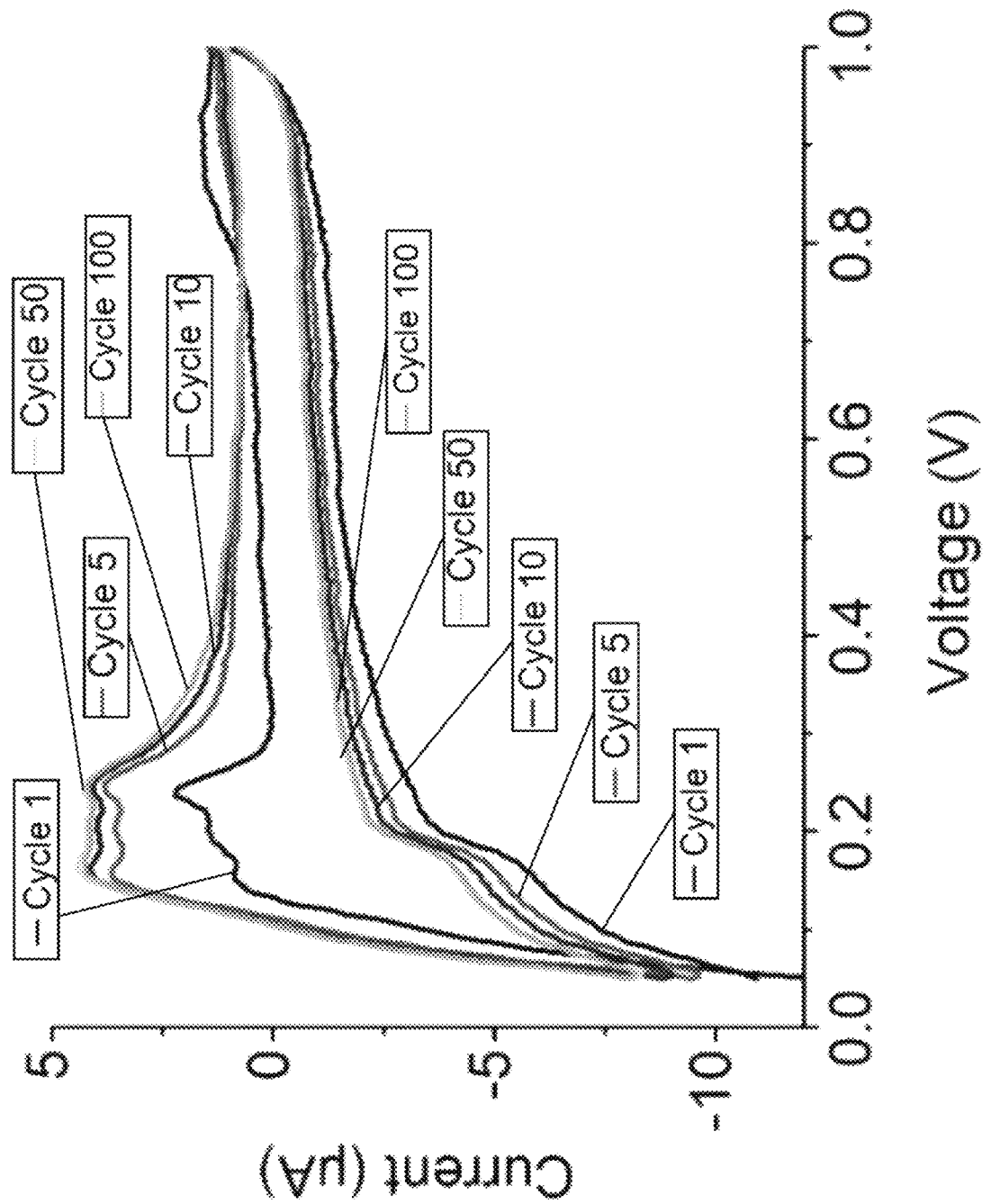

FIGS. 7A-B are a pictorial representation of the cyclic voltammetry scans for the electrochemical half-cells with $Li_3OCl$ solid-state electrolyte (l=360 μm), graphite-based anode, and lithium metal reference electrode at (a) 50° C., and (b) 100° C. The CV data at 25° C. is provided in the inset.

Figure 8A:
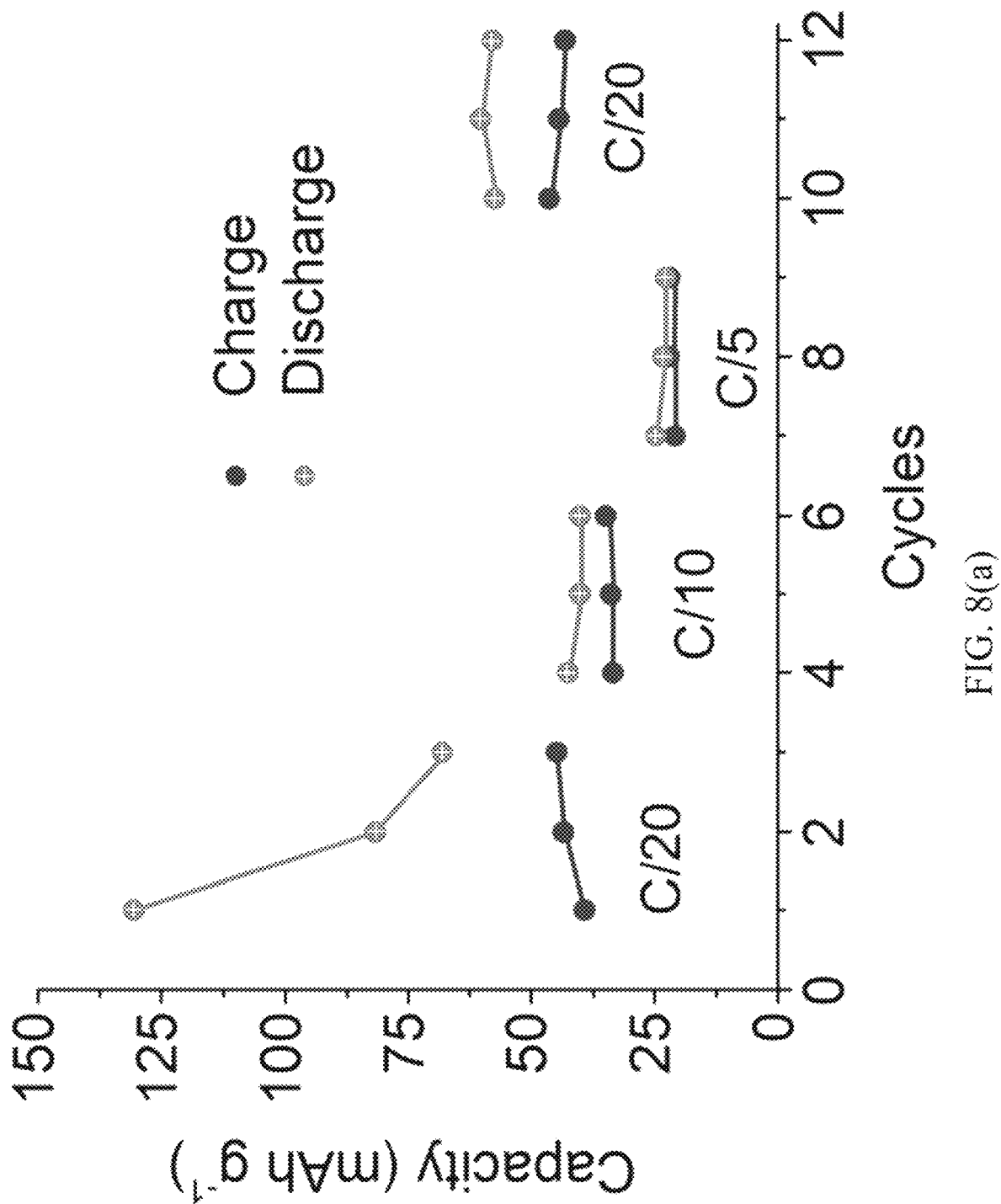
Figure 8B:
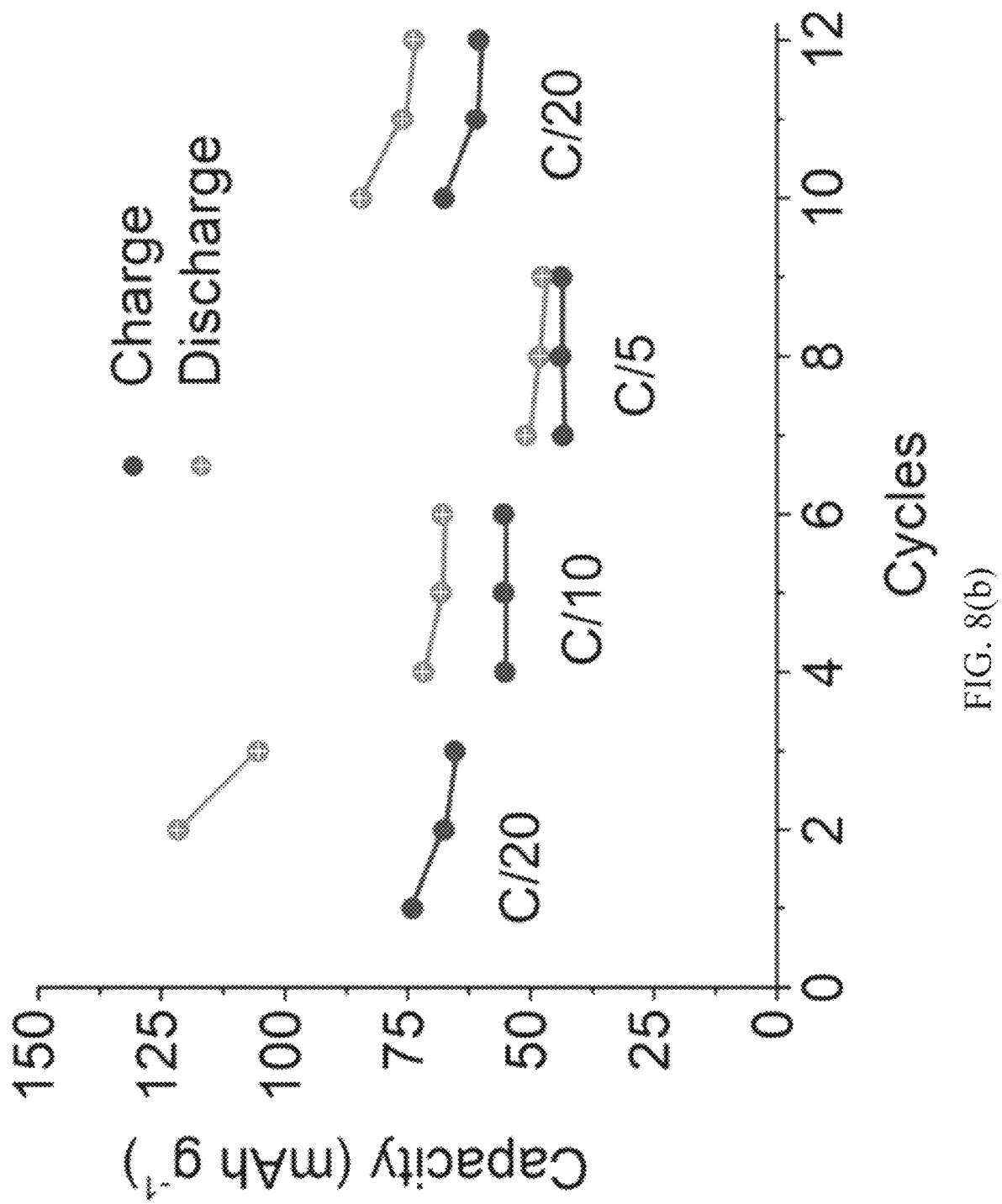

FIGS. 8A-B are a pictorial representation of the specific capacity at various C-rates, specifically C/20, C/10, C/5, and C/20 (3 cycles each, $1^{st}$ C/20 cycle was used to discharge the cells from OCV and is not shown on the graphs) vs. the cycle number for the solid-state electrochemical half-cell with lithium metal reference electrode and C/Cu working electrode (WE) at 50° C. (a) and 100° C. (b).

Figure 9A:
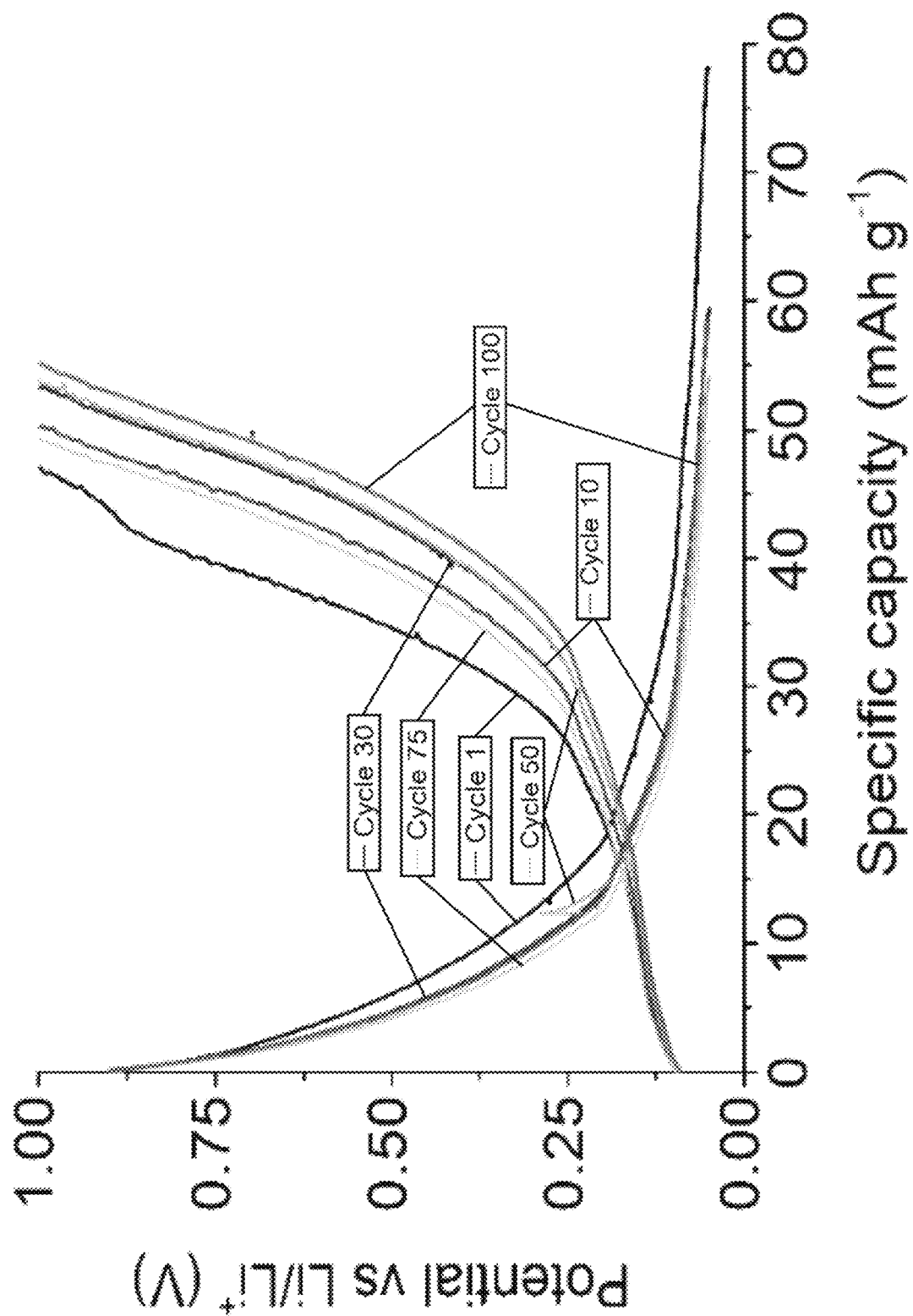
Figure 9B:
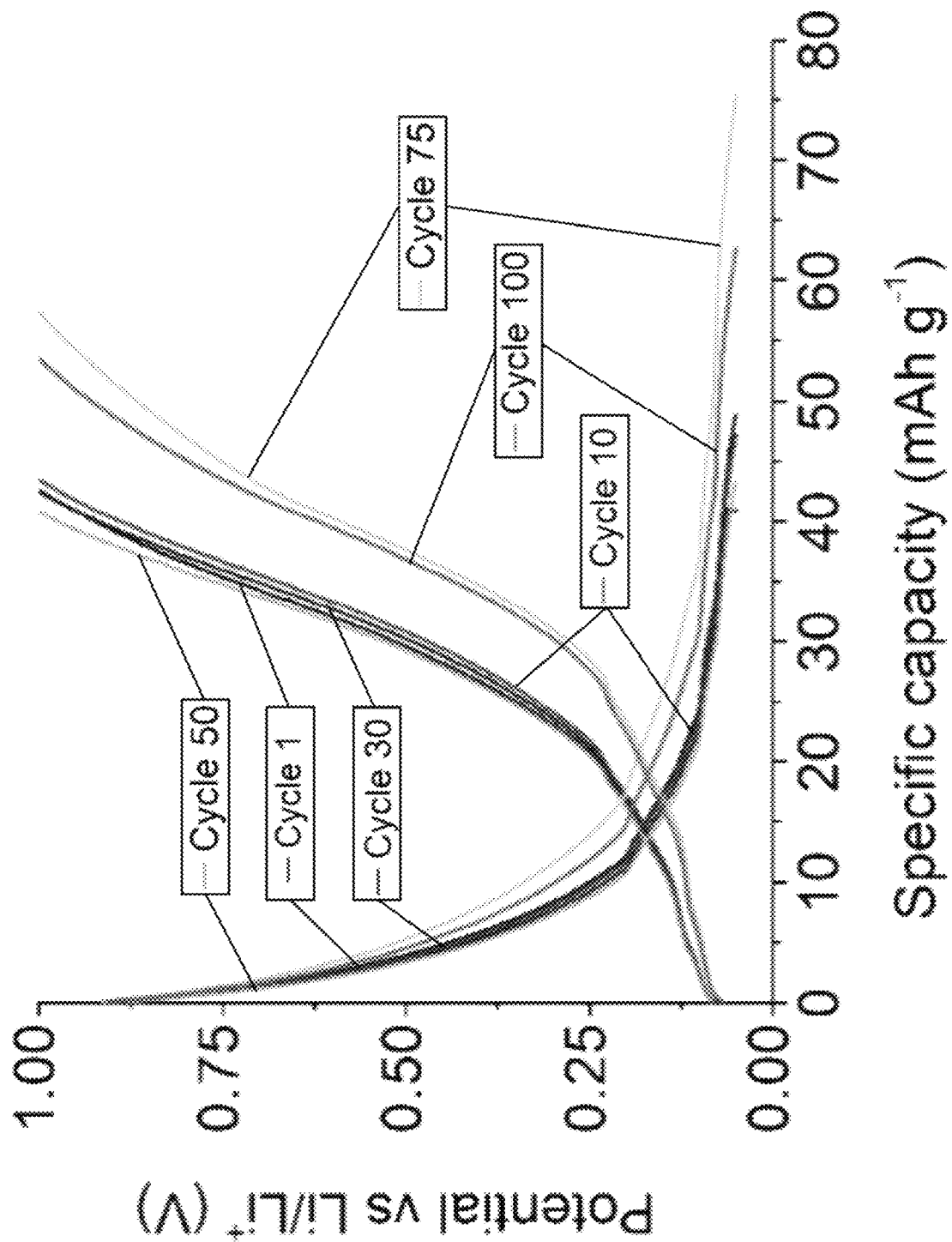

FIGS. 9A-B are a pictorial representation of the galvanostatic charge-discharge voltage vs. capacity profiles of the half cells with $Li_3OCl$ electrolyte (l=350 μm) in the voltage range of 0.05-1.0 V (vs. Li metal) at C/5 rate measured at (a) 50° C. and (b) 100° C.

Figure 10A:
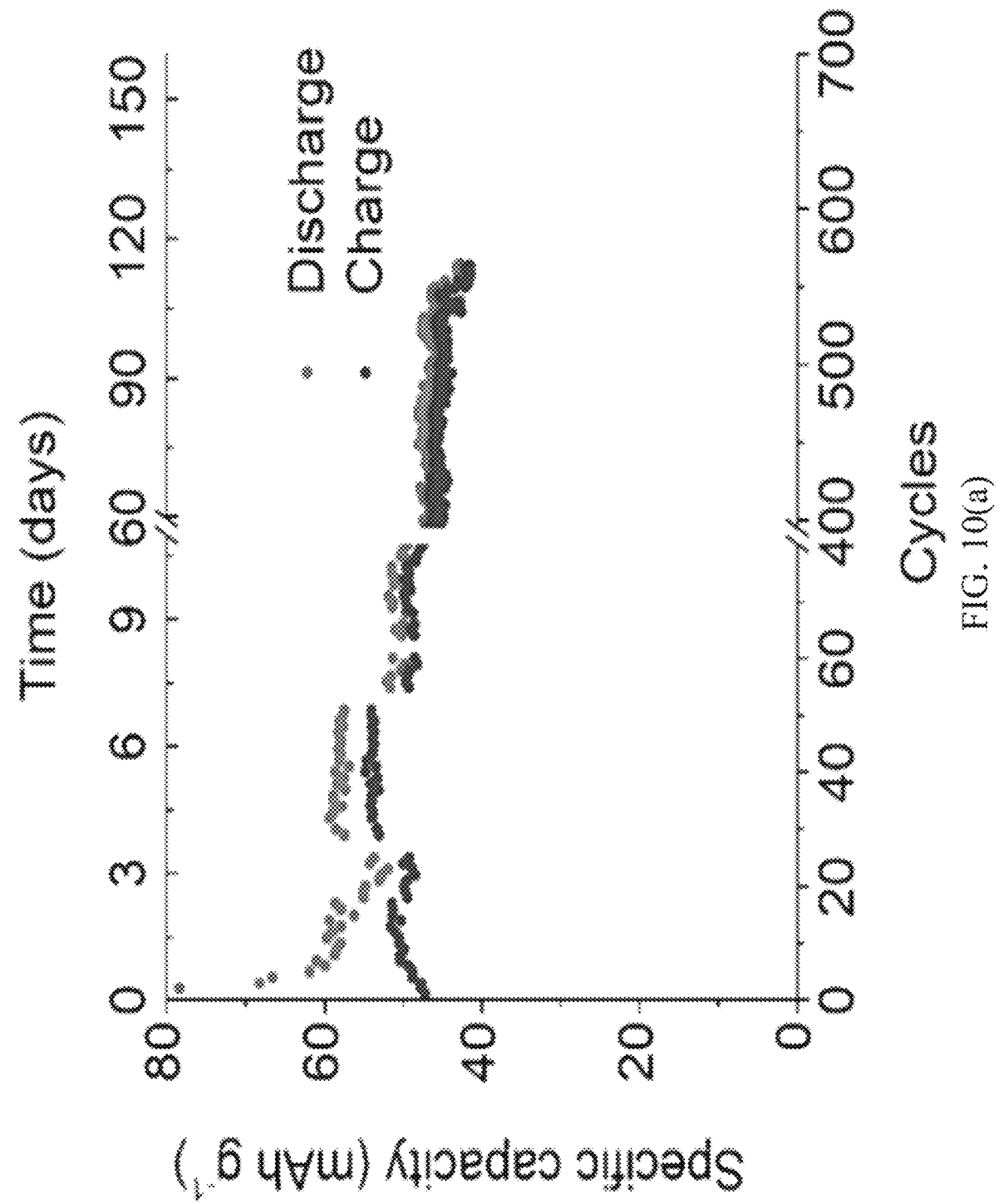
Figure 10B:
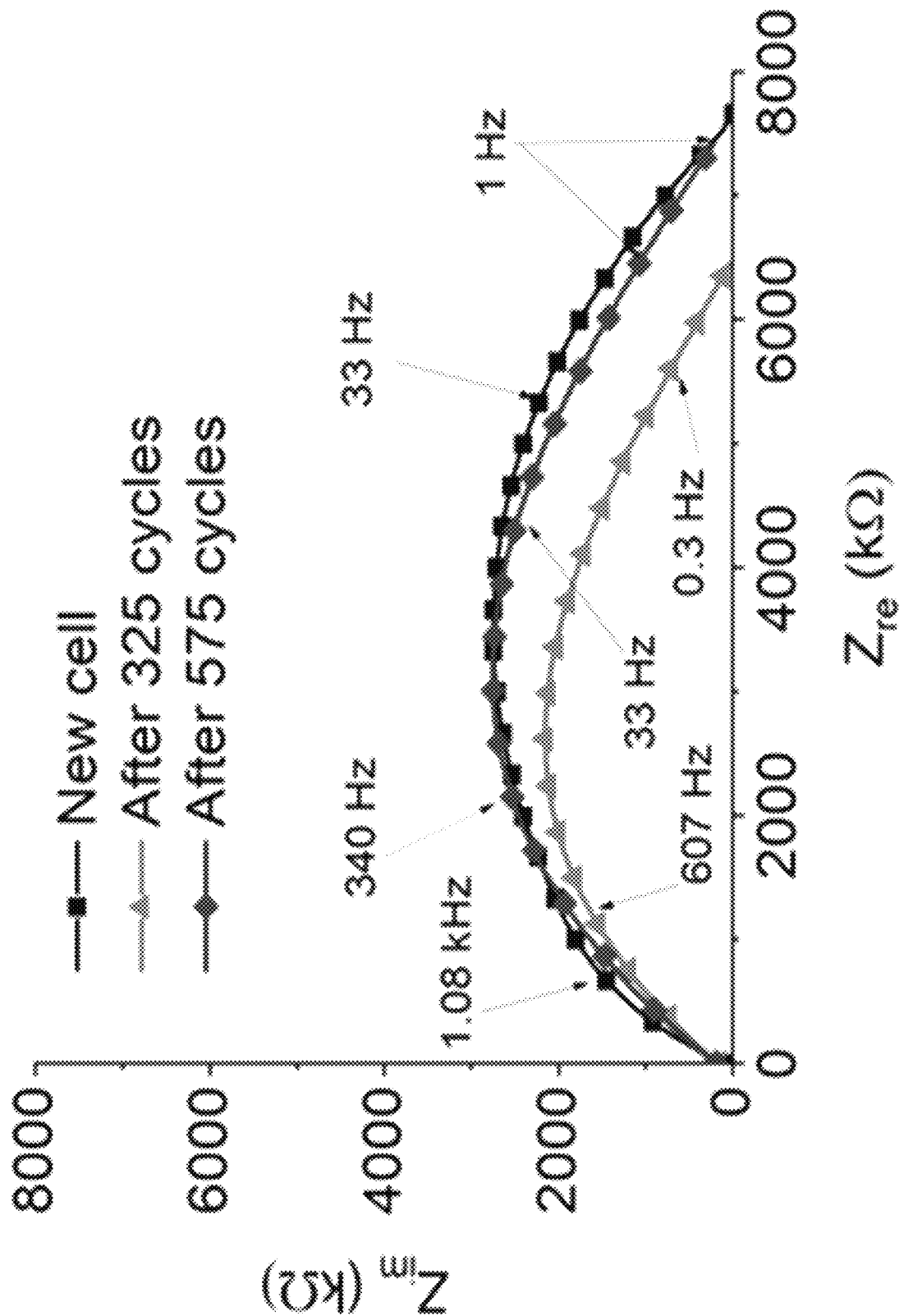

FIGS. 10A-B are a pictorial representation of the cyclability data at 50° C. (a) and for the electrochemical half-cells at C/5 rate and the corresponding AC impedance profiles measured at room temperature for the cells after long-term experiments at 50° C. (b).

Figure 11A:
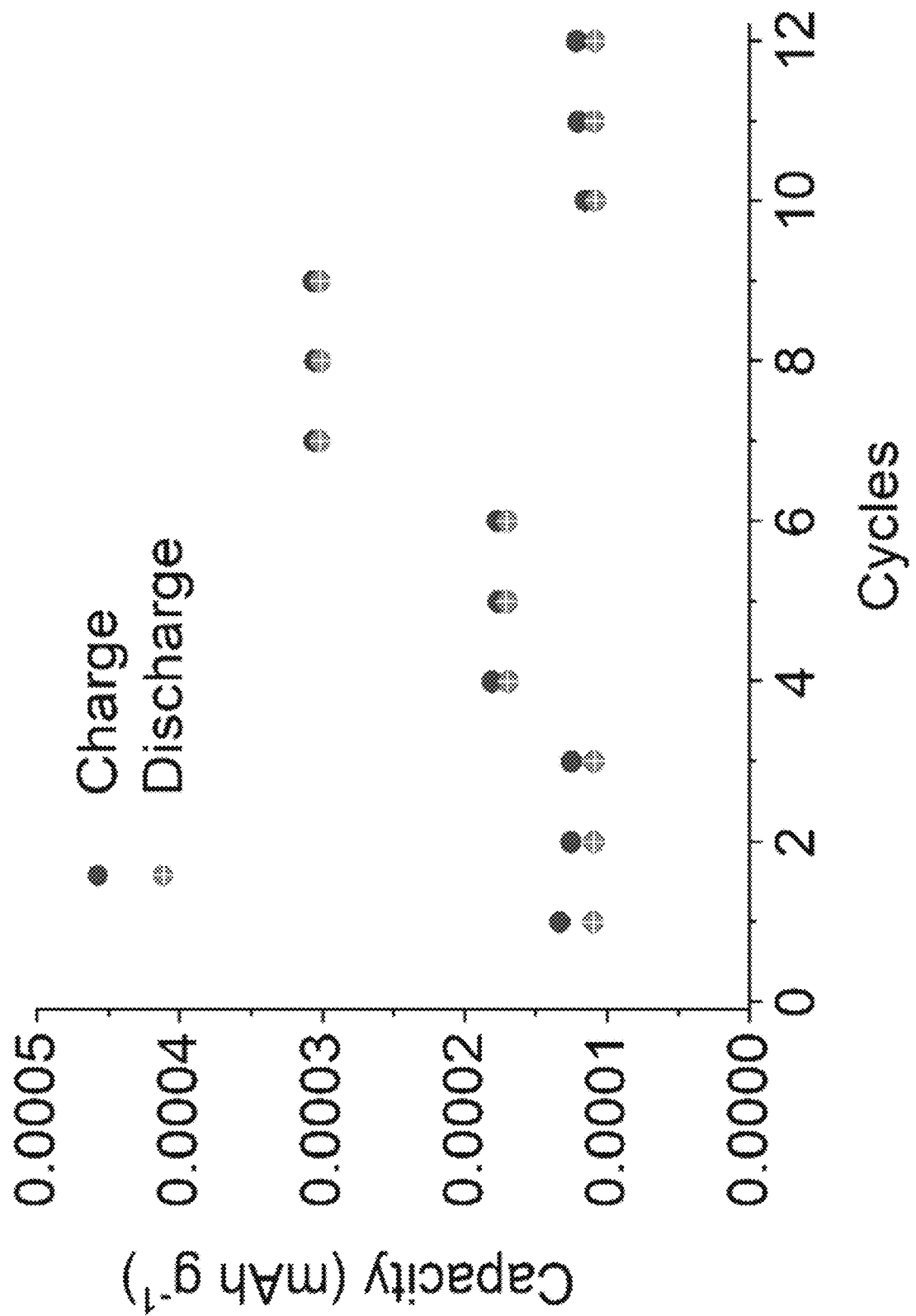
Figure 11B:
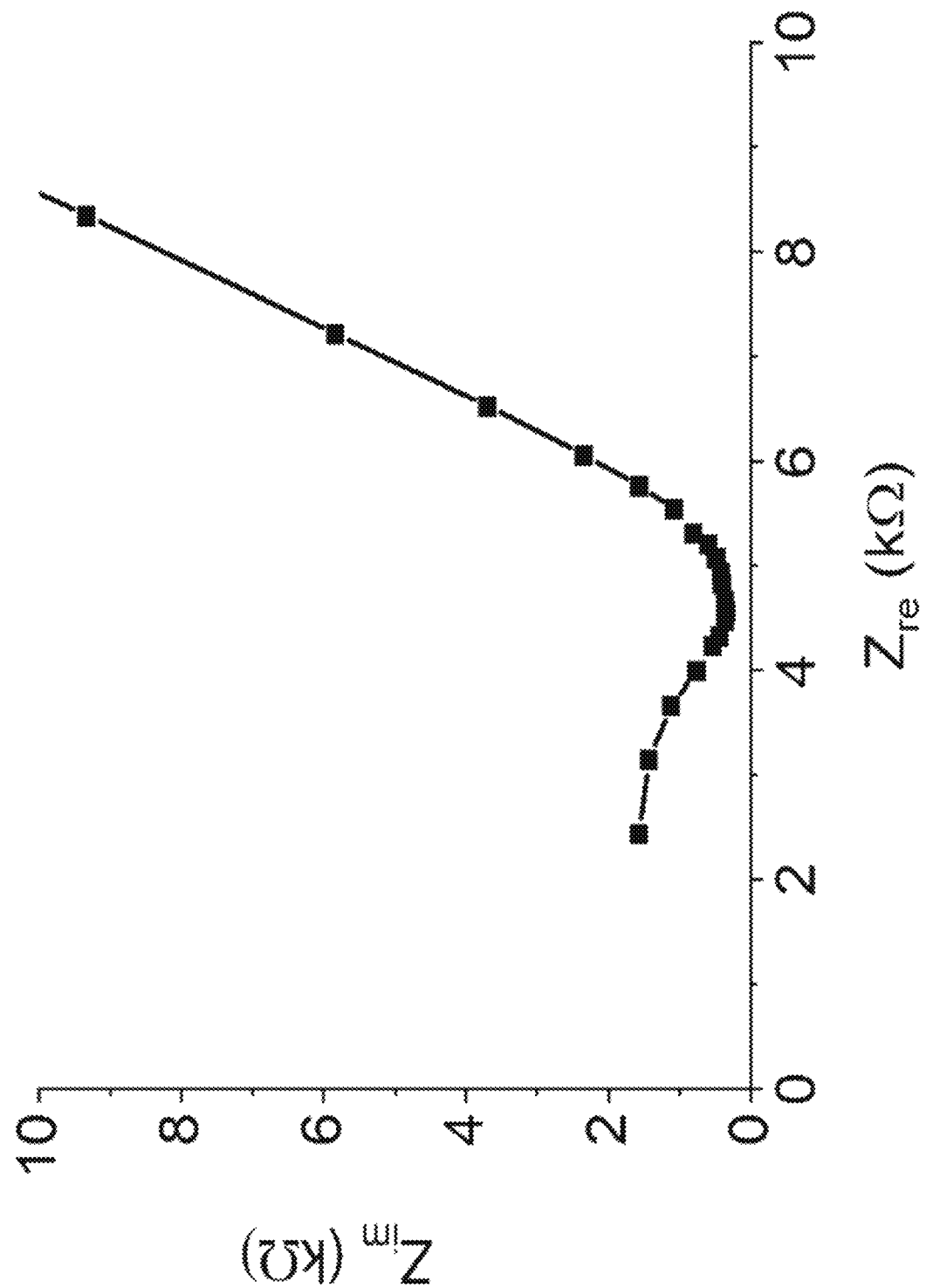

FIGS. 11A-11B are a pictorial representation of the specific capacity at various C-rates, specifically C/20, C/10, C/5, and C/20 vs. the cycle number for the solid-state electrochemical half-cell with lithium metal reference electrode and Al/NMC cathode at 100° C. (a) and the corresponding impedance data for the fully integrated electrode-electrolyte architecture with lithium metal as an anode.

DETAILED DESCRIPTION

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of a manufacturing process of the solid-state glass-ceramic electrolytes, it is fully contemplated embodiments of the present invention could be used in most any solid-state glass-ceramic electrolytes application without departing from the spirit of the invention.

The manufacturing process includes compression of the melted electrolyte onto the said electrode surface followed by fast cooling, resulting in improved morphology at the electrolyte-electrode interface, absence of grain boundary effects and long-term electrochemical durability observed in contact with lithium metal at elevated temperatures. The disclosed invention does not require multiple manufacturing steps or moisture by-product removal. It is demonstrated the solid-state electrolyte produced by the method on the surface of graphite-based anodes or metal oxide-based cathodes meets the requirements for reversible lithium-ion intercalation and deintercalation during charge-discharge processes. Long-term cyclability tests at elevated temperatures confirm the absence of chemical or electrochemical processes at the solid-state electrolyte-electrode interfaces when the solid-state electrolyte is deposited by the said method.

The disclosed invention is different from other inventions known in the art, especially those using other types of solid-state ceramic electrolytes, such as garnets, perovskites, LISICONs etc. having extremely high melting points, prohibitive cost, and grain boundary effects due to their ceramic nature.

In comparison to disclosures regarding antiperovskites, the advantage of the proposed method is in the manufacturing of the electrolyte layers directly on the active electrode from a melted phase leading to strong adhesion between electrolyte and the active electrode surfaces, absence of grain boundary effects due to fast cooling, extended cyclability at elevated temperatures and absence of chemical and electrochemical deterioration in presence of lithium metal when the said method is applied.

The disclosed method of the solid-state electrolyte manufacturing can be utilized in electrochemical energy generation and storage systems, such as lithium-ion or lithium-metal batteries, integrated solar-self-charging batteries, electrolyzes, supercapacitors, and combinations thereof. Furthermore, possible applications can also include sensors and photo- or bioelectrochemical devices require high ionic conductivity combined with mechanical integrity and electrochemical stability.

The present invention relates to a method of manufacturing the solid-state electrolyte layers on the surface of an active electrode by direct contact of the said electrode with the melted electrolyte at temperatures above or close to the melting point of the electrolyte.

The present invention also relates to a method of manufacturing solid-state electrolyte layers directly on the active electrode surfaces, specifically on the surface of anode or cathode, by direct contact of the said electrodes with the electrolyte at temperatures above or close to its melting point.

According to one specific embodiment, the manufacturing method comprises a step when a representative solid-state electrolyte from the class of lithium undoped or doped antiperovskites and their polymorphs with a general formula $Li_{3-x}M_x C_{1-y}C_y'A_{1-z}A'_z$, where M is hydrogen, or a metal from the first three groups of the periodic table of elements and x is defined by the charge of the corresponding metal, C and C' are chalcogens (O, S, Se), and A and A' are halogens (F, Cl, Br, I), or ions, such as $BH_4^+$ or $BF_4^+$, can be applied.

The present invention also relates to a group of the said electrically conductive and cost-effective solid-state materials and their nanocomposites have relatively low melting point temperatures, specifically in the range from 250° C. and up to 600° C. allowing application of an economically feasible method described in this invention.

According to one embodiment, the proposed invention describes the method eliminating grain boundary formation in the solid-state electrolyte layers directly deposited on the electrode surface due to the applied process of fast cooling. Absence of grain boundaries within the electrolyte layer produced by the said method improves the electric conductivity and the lithium-ion transport in the said solid-state electrolyte.

According to one specific embodiment, the proposed invention describes the method producing solid-state electrolyte layers not undergoing phase transformations within the operation temperature range in the range of −20° C.-100° C. Absence of phase transformations within the solid-state electrolyte ensures high lithium-ion transport within the said operation temperature range of the operational electrochemical device.

According to one embodiment, the proposed invention describes the method produces solid-state electrolyte layers on the electrode surface, after a compression force is applied to the electrode located on top of the melted solid-state electrolyte.

According to one embodiment, the proposed invention describes the method producing solid-state electrolyte layers on the active electrode surface, and specifically anode or cathode electrode surface, after a compression force is applied. This method results in intimate contact and minimized interfacial resistance between the said electrolyte and the electrodes.

According to one embodiment, the present disclosure is related to the disclosed invention related to the class of lithium undoped and doped antiperovskites and their polymorphs are produced in a moisture-free environment, such as those containing different inert or noble gases, including but not limited to helium, argon, or nitrogen or vacuum.

According to one embodiment, the present disclosure is related to a manufacturing process involving a class of lithium undoped and doped antiperovskites and their polymorphs after melting in a moisture-free environment, can be brought in direct contact with the active anode or cathode electrode surface due low meting point of the said electrolytes.

According to one specific embodiment, the present disclosure is related to the manufacturing process involving a class of lithium undoped and doped antiperovskites and their polymorphs can be brought in direct contact with the active anode or cathode electrode surface and compressed by using a metal with low adhesion toward the said electrode, preferably nickel foil.

The present invention relates to a group of electrically conductive and cost-effective solid-state materials and their nanocomposites, formed by the direct exposure of the battery electrodes to the melted electrolyte with addition of polymer-based, inorganic, or organic materials for mechanical electrolyte phase integrity with a specific feature of chemical, electrochemical, and crystal phase stability at elevated temperatures, and more specifically from room temperature and up to at least 100° C.

Different from other disclosures in the field, the present invention relates to the electrically conducting solid-state antiperovskite electrolytes produced in the said way do not form interfacial phases in contact with lithium metal anodes. These low conducting interfacial phases known in the art as Solid Electrolyte Interface (SEI) layers have not been detected for the solid-state electrolyte layers formed on the active electrode surface using the method disclosed in this invention.

Different from other disclosures in the field, the present invention relates to the electrically conducting solid-state electrolytes with antiperovskite crystal structures produced in a moisture-free environment on the active positive or negative battery electrode surface or both and the performance of the battery made in the said way.

Different from other disclosures in the field, the present invention relates to the electrically conducting solid-state electrolytes with antiperovskite crystal structures are produced in a moisture-free environment on the active positive or negative battery electrode surface or both and the performance of the battery made in the said way at elevated temperatures.

The applications of the present invention described in this disclosure are relevant but are not limited to the electrochemical energy generation and storage devices and specifically the electrode materials of the said devices; among them batteries, die-sensitized solar cells, fuel cells, supercapacitors, or combination thereof. Yet other application areas may also include touchscreens, organic light-emitting diodes, flexible organic solar cells, and organic electrochemical transistors. Furthermore, the disclosed solid-state electrolyte can be used in hole-injecting transparent plastic and flexible electrodes for polymer light emitting diodes, field-effect transistors, and photovoltaic cells.

While conventional techniques use the expensive precursors and high-temperature synthesis for manufacturing of the solid-state electrolytes, the disclosed invention is related to the antiperovskite-based materials with a general formula $Li_{3-x}M_{3x} C_{1-y}C_y'A_{1-z}A'_z$. where M is H, alkali, or alkali earth metal, C and C' are chalcogens (O, S, Se), and A and A' are halogens (F, Cl, Br, I) or ions, such as $BH_4^+$ or $BF_4^+$. The invention is specifically focused on a process of an electrolyte or an electrolyte-based nanocomposite manufacturing in a moisture-free environment possess constant crystal structure within the entire range of operation temperatures (−20° C.-100° C.) and do not produce additional solid-state phases, such as those detected earlier along the grain boundaries in garnets. Specifically, a process of an electrolyte or an electrolyte-based nanocomposite manufacturing process in a moisture-free environment resulting in an electrochemically stable, highly conductive electrolyte in the absence of the phase transformations in a broad temperature range produced by the said method is disclosed.

The present invention demonstrates a manufacturing process of an solid-state electrolyte layer by the said method resulting in an improved electrode-electrolyte interface due to the direct contact with melted electrolyte in a moisture-free controlled environment favorable for solid-state lithium-ion batteries operating in a broad temperature range and at least up to 100° C. by utilizing the melting point value of the antiperovskite, e.g. lithium halide (~282° C.).

The inventors of the embodiments disclosed herein, successfully tested the manufacturing process of the solid-state glass-ceramic electrolytes, known in the art as antiperovskites, directly on the active either positive or negative battery electrode surface, followed by compression of the electrolyte onto the said surface and fast cooling, results in improved long-term electrochemical durability observed in contact with lithium metal at the elevated temperatures. These embodiments validate, the solid-state electrolyte-electrode interfaces can be produced on the surface of metal, e.g. nickel foil, resulting in a grain-free electrolyte morphology and long-term electrochemical stability of the electrolyte in contact with lithium metal.

EXAMPLES FOR VARIOUS ASPECTS OF THE PRESENT DISCLOSURE

Example 1: Confirmation of the Crystal Structure of the Solid-State Antiperovskite Electrolyte Formed on the Surface of Metal that can be Delaminated after Fast Cooling Disclosed in this example, is the first step of melting the solid-state electrolyte precursors on the surface of a metal, more preferably nickel foil, that does not adhere to the said electrolyte after cooling down to room temperature and can be easily delaminated in the end of the manufacturing process. The XRD data (FIG. 2) represents the crystal structure of the antiperovskite, specifically solid-state lithium halide $Li_3OCl$ electrolyte formed on the surface of the nickel foil from the corresponding inorganic precursors. The experimental XRD spectrum of the $Li_3OCl$ fits the simulated spectra with the major peaks corresponding to (011), (002), and (112) Miller indices as well as two smaller peaks with (111) and (022). The experimental XRD spectrum matches the $Li_3OCl$ XRD spectrum reported earlier [20] for alternative $Li_3OCl$ synthesis conditions. However, a number of admixtures, such as LiCl, LiOH, $Li_2O$, and $Li_2CO_3$ [30-32] were detected in the original XRD samples. Besides the identified compounds, other compounds could be present, e.g. $Li_2OHCl$ which XRD peaks align with the XRD patterns shown in FIG. 2 and depend on the speed of the cooling process [18]. The data suggests that specific precautions should be considered to avoid contact with atmospheric moisture and $CO_2$, ensure complete conversion of the precursors into $Li_3OCl$ antiperovskite, and pay specific attention to the synthesis parameters.

Example 2: Confirmation of the Electrolyte Grain Boundary-Free Morphology after Compression The SEM images of the antiperovskite, and specifically lithium halide electrolyte (FIG. 3), demonstrate the effect of compression after melting the said electrolyte at 350° C. on the nickel foil surface. The rough surface of the uncompressed electrolyte after peeling off the nickel foil becomes more visible at higher magnifications. On the contrary, the surface of the compressed electrolyte is uniform without significant morphological changes across the surface. It appears to be more homogenous with no evidence of crystal structure formation that could potentially occur without compression or due to temperature variations because of the complex behavior of viscous liquids close to their glass transition temperatures [34].

Example 3: Manufacturing of the Antiperovskite Electrolyte on the Graphite-Based Anode Surface and Delamination of the Metal Foil Substrate For manufacturing of the solid-state electrolyte, specifically lithium halide $Li_3ClO$, on the commercial anode surface, lithium chloride and lithium hydroxide precursors were mixed in an agate mortar inside an argon MBraun glovebox with ≤1 ppm $H_2O$ and ≤1 ppm $O_2$. A hotplate inside the glovebox with a surface temperature of 350° C. was used to heat the electrolyte precursor powder on the nickel foil until the powder completely melts. The Cu/C electrodes with diameter d=17.0 mm and thickness l=0.012 mm were degassed overnight in vacuum and pressed upon the molten electrolyte for a short period of time, and specifically for 15 seconds. The multilayer structure comprising of nickel foil with the molten electrolyte and Cu/C working electrode (WE) was taken off the hotplate and allowed to cool. The nickel foil was delaminated from the solid-state electrolyte resulting in Cu/C half-cell with adhered solid-state electrolyte layer.

Example 4: Demonstration of the Lithium Ion Transport in the Antiperovskite Electrolyte Layers in Absence of the Crystal Phase Transformations at Elevated Temperatures The electrochemical half-cells were assembled with the Cu/C working attached to the solid-state electrolyte in contact with lithium metal foil. The active surface area of the half-cells defined by the area of lithium metal disks was ~1.13 cm$^2$. A stainless-steel spacer (0.5 mm) and a wave-spring were placed on top of the lithium disk before crimping the cell at 1000 psi in argon glovebox with ≤1 ppm $H_2O$ and ≤1 ppm $O_2$. The AC impedance data was sampled with 30 points taken over a frequency range of 200 kHz-1 mHz using logarithmic point spacing at AC amplitude of 5.00 mV.

The AC impedance experimental and fitted data using the equivalent circuit (FIG. 4a) is presented in FIG. 4b,c. Z-view software from Scribner Associates Inc. was used to model the equivalent circuit (FIG. 4a). The same equivalent circuit was then used to fit all data obtained from the experiments at various temperatures. FIG. 3b,c shows that the experimental and the fitted data are in good correlation indicating a functional equivalent circuit.

The observed AC impedance spectra for half-cells with a solid-state electrolyte membrane (360 μm thick) at different temperatures within the range of 20-100° C. demonstrates the lithium-ion charge transfer represented by the semi-circles and the Warburg impedance at lower frequencies responsible for the lithium-ion diffusion. At room temperature (FIG. 4b) the charge transfer resistance is extremely high reaching ~130 kOhm/cm$^2$ and does not allow for adequate lithium-ion half-cell battery performance evaluation. With temperature increase to 100° C., a significant decrease in the solid-state electrolyte resistance down to ~2.6 kOhm/cm$^2$ is observed (FIG. 4c). The corresponding Arrhenius plot (FIG. 5) is linear which indicates the absence of the crystal phase transformations reported earlier for the garnet-type solid-state ceramic [35] and $Li_2OHCl$ electrolytes [22]. The AC impedance data for the $Li_3OCl$ solid-state electrolyte at RT demonstrates a linear dependence vs. membrane thickness (FIG. 6). As expected, the charge transfer resistance of the $Li_3OCl$ solid-state electrolyte decreases with distance traveled by lithium ions and reaches the value of 106 kOhm/cm$^2$ for the 296 μm thick electrolyte membrane.

Example 5: Antiperovskite Solid-State Electrolyte Performance at Elevated Temperatures by Cyclic Voltammetry The temperature effect was investigated by cyclic voltammetry in a temperature range up to 100° C. (FIG. 7a,b). At room temperature, due to high charge transfer resistances in relatively thick solid-state electrolyte membranes, the peaks relevant to lithium ion intercalation-deintercalation within graphite phase are not visible. On the contrary, at 50° C. (FIG. 7a) the lithiation peaks are detected at 0.20V in correlation with those reported earlier [36]. At 100° C. (FIG. 7b) the lithiation peaks have higher resolution due to significant drop in the charge transfer resistance (FIG. 4b,c). Furthermore, at 100° C. three peaks at 0.17V, 0.21V, and 0.25V are visible corresponding to different activation energies of the lithium ions participating in the intercalation process within the graphite anode. Overall, the current density at 100° C. is an order of magnitude higher than at 50° C. indicating more efficient lithium-ion transport, which is in direct correlation with the impedance data (FIG. 4).

Example 6: Antiperovskite Solid-State Electrolyte at Elevated Temperatures: C-Rate Capability and Galvanostatic Cycling The solid-state electrolyte was evaluated in a half-cell configuration in the voltage window of 0.05 V-1V. The tests performed at 50° C. and 100° C. (FIG. 8a, b) confirm the performance reproducibility in the electrochemical cells, absence of the specific capacity losses within graphite, and, the capability of the antiperovskite solid-state electrolyte to provide lithium-ion transport.

The discharge-charge cycles were carried out at 50° C. and 100° C. in the voltage window of 0.05-1.0 V (vs. Li metal) at a rate of C/5 corresponding to the current density of 7.3 mAg$^{-1}$ (FIG. 9). For clarity, only selected cycles are shown. During the first discharge and the following cycles, almost no voltage loss was detected. Within the first cycles, the charge curves shift towards the higher capacity values (FIG. 9b) and merge during the following $10^{th}$-$50^{th}$ cycles. The stable capacity values were reached only after 10-15 cycles, which could be due to the enhancement of the ionic transport kinetics within the antiperovskite electrolyte. It is assumed that the conditioning effect extending up to the 10-15$^{th}$ cycle is due to lithium intercalation/deintercalation within the graphite structure that requires several charge-discharge cycles to establish conduction pathways for lithium ions within the graphite and at the graphite-solid electrolyte interphase.

Example 7: Long-Term Continuous Cyclability Tests in Presence of Lithium Metal

The tests performed over a four-month period at a rate of ~C/5 (FIG. 10) reveal a specific capacity retention of 80% within 575 cycles at 50° C. (FIG. 10a). On contrary to the drastic capacity losses observed earlier for the antiperovskite thin-film cells after only a dozen cycles [37], these results prove, for the first time, the ability of the antiperovskite electrolyte to transport lithium ions during long periods of time at elevated temperatures in presence of lithium metal reference electrode. The corresponding impedance data evaluated for different cycling times at 50° C. (FIG. 10b) indicate almost constant charge transfer resistances over the time required to perform 575 cycles at 50° C. (FIG. 10b). This performance is significantly superior to the perornce of the electrochemical cells with liquid electrolytes that are known to form SEI layers [1].

Example 8

A full cell assembled by the disclosed method in which instead of copper-supported anode an NMC-based cathode has been used (FIG. 11). The C-rate capability tests demonstrate reproducible data (FIG. 11a) that confirms the validity of the disclosed manufacturing method and the capability of the full electrochemical cell to transfer lithium ions from anode to cathode through the solid-state electrolyte and intercalate the cathode during discharge. During he discharge process lithium-ions are transferred back to the anode that is reflected in the corresponding values of the charge transfer resistance (FIG. 11b).

LIST OF REFERENCES CITED

1. Ganesh, P., P. Kent, and D.-e. Jiang, *Solid-electrolyte interphase formation and electrolyte reduction at Li-ion battery graphite anodes: Insights from first-principles molecular dynamics*. The Journal of Physical Chemistry C, 2012. 116(46): p. 24476-24481.
2. Xu, K., *Nonaqueous liquid electrolytes for lithium-based rechargeable batteries*. Chemical reviews, 2004. 104(10): p. 4303-4418.
3. Yang, H., G. V. Zhuang, and P. N. Ross, *Thermal stability of LiPF 6 salt and Li-ion battery electrolytes containing LiPF 6*. Journal of Power Sources, 2006. 161(1): p. 573-579.
4. Schweikert, N., et al., *Suppressed lithium dendrite growth in lithium batteries using ionic liquid electrolytes: Investigation by electrochemical impedance spectroscopy, scanning electron microscopy, and in situ 7Li nuclear magnetic resonance spectroscopy*. Journal of Power Sources, 2013. 228: p. 237-243.
5. Iwamoto, K. and S. Ito, *All solid state battery with coated substrate*. 2006, Google Patents.
6. Yoshida, T., H. Katsukawa, and S. Okada, *All-solid-state battery*. 2011, Google Patents.
7. Inda, Y., *Lithium ion conductive solid electrolyte and method for manufacturing the same*. 2017, Google Patents.
8. Ueda, I., et al., *Solid electrolyte for all-solid-state lithium ion secondary battery, all-solid-state lithium ion secondary battery using the same, and method for producing solid electrolyte for all-solid-state lithium ion secondary battery*. 2018, Google Patents.
9. Ohta, S., et al., *Co-sinterable lithium garnet-type oxide electrolyte with cathode for all-solid-state lithium ion battery*. Journal of Power Sources, 2014. 265: p. 40-44.
10. Hitz, G. T., E. D. Wachsman, and V. Thangadurai, *Highly Li-Stuffed Garnet-Type $Li_{7+x}La_3Zr_{2-x}Y_xO_{12}$*. Journal of The Electrochemical Society, 2013. 160(8): p. A1248-A1255.
11. Truong, L., et al., *Facile proton conduction in H+/Li+ ion-exchanged garnet-type fast Li-ion conducting $Li_5La_3Nb_2O_{12}$*. Journal of Materials Chemistry A, 2013. 1(43): p. 13469-13475.
12. Truong, L., J. Colter, and V. Thangadurai, *Chemical stability of Li-stuffed garnet-type $Li_{5+x}Ba_xLa_{3-x}Ta_2O_{12}$ (x=0, 0.5, 1) in water: a comparative analysis with the Nb analogue*. Solid State Ionics, 2013. 247: p. 1-7.
13. Inaguma, Y., et al., *High ionic conductivity in lithium lanthanum titanate*. Solid State Communications, 1993. 86(10): p. 689-693.
14. Harada, Y., et al., *Lithium ion conductivity of polycrystalline perovskite $La_{0.67-x}Li_{3x}TiO_3$ with ordered and disordered arrangements of the A-site ions*. Solid State Ionics, 1998. 108(1): p. 407-413.

15. Bachman, J. C., et al., *Inorganic solid-state electrolytes for lithium batteries: mechanisms and properties governing ion conduction.* Chemical reviews, 2015. 116(1): p. 140-162.
16. Kanno, R. and M. Murayama, *Lithium Ionic Conductor Thio-LISICON: The Li t S GeS2 P 2 S 5 System.* Journal of The Electrochemical Society, 2001. 148(7): p. A742-A746.
17. Takada, K., et al., *Interfacial phenomena in solid-state lithium battery with sulfide solid electrolyte.* Solid State Ionics, 2012. 225: p. 594-597.
18. Kuhn, A., et al., *A new ultrafast superionic Li-conductor: ion dynamics in $Li_{11}Si_2PS_{12}$ and comparison with other tetragonal LGPS-type electrolytes.* Physical Chemistry Chemical Physics, 2014. 16(28): p. 14669-14674.
19. Hartmann, P., et al., *Degradation of NASICON-type materials in contact with lithium metal: Formation of mixed conducting interphases (MCI) on solid electrolytes.* The Journal of Physical Chemistry C, 2013. 117(41): p. 21064-21074.
20. Zhao, Y. and L. L. Daemen, *Superionic conductivity in lithium-rich anti-perovskites.* Journal of the American Chemical Society, 2012. 134(36): p. 15042-15047.
21. Zhang, J., et al., *High pressure-high temperature synthesis of lithium-rich $Li_3O(Cl, Br)$ and $Li_{3-x}Ca_{x/2}OCl$ antiperovskite halides.* Inorganic Chemistry Communications, 2014. 48: p. 140-143.
22. Hood, Z. D., et al., *$Li_2OHCl$ crystalline electrolyte for stable metallic lithium anodes.* Journal of the American Chemical Society, 2016. 138(6): p. 1768-1771.
23. Aguesse, F., et al., *Investigating the Dendritic Growth during Full Cell Cycling of Garnet Electrolyte in Direct Contact with Li Metal.* ACS applied materials & interfaces, 2017. 9(4): p. 3808-3816.
24. Stegmaier, S., et al., *$Li^+$ defects in a solid-state Li ion battery: theoretical insights with a Li3OCl electrolyte.* Chemistry of Materials, 2017.
25. Zhao, Y., L. Daemen, and M. Braga, *Anti-Perovskite Solid Electrolyte Compositions.* 2012, WO Patent 2,012, 112,229.
26. Lu, X., et al., *Methods for growth of lithium-rich antiperovskite electrolyte films and use thereof* 2015, Google Patents.
27. Jinlong, Z., et al., *Transition-metals doped lithium-rich anti-perovskites for cathode applications.* 2018, Google Patents.
28. Zhao, Y. and L. L. Daemen, *Anti-perovskite solid electrolyte compositions.* 2016, U.S. Pat. No. 9,246,188 B2.
29. Oladeji, I. O., *Method of forming solid state electrolyte having high lithium ion conduction and battery incorporating same.* 2013, Google Patents.
30. Ye, M., et al., *A respiration-detective graphene oxide/lithium battery.* Journal of Materials Chemistry A, 2016. 4(48): p. 19154-19159.
31. Chien, W.-m., D. Chandra, and J. H. Lamb, *X-ray diffraction studies of Li-based complex hydrides after pressure cycling.* Adv. X-Ray Anal, 2008. 51: p. 190-195.
32. Momma, K. and F. Izumi, *VESTA 3 for three-dimensional visualization of crystal, volumetric and morphology data.* Journal of applied crystallography, 2011. 44(6): p. 1272-1276.
33. Hanghofer, I., et al., *Untangling the Structure and Dynamics of Lithium-Rich Anti-Perovskites Envisaged as Solid Electrolytes for Batteries.* Chemistry of Materials, 2018. 30(22): p. 8134-8144.
34. Debenedetti, P. G. and F. H. Stillinger, *Supercooled liquids and the glass transition.* Nature, 2001. 410(6825): p. 259.
35. Huang, M., et al., *Effect of sintering temperature on structure and ionic conductivity of $Li_{7-x}La_3Zr_2O_{12-0.5x}$ (x=0.5~0.7) ceramics.* Solid State Ionics, 2011. 204: p. 41-45.
36. Zhu, X., et al., *First principle calculation of lithiation/dilithiation voltage in Li-ion battery materials.* Chinese Science Bulletin, 2011. 56(30): p. 3229.
37. Lü, X., et al., *Antiperovskite $Li_3OCl$ Superionic Conductor Films for Solid-State Li-Ion Batteries.* Advanced Science, 2016. 3(3).

What is claimed is:

1. A method of creating a solid-state glass-ceramic electrolyte, comprising the step of:
   manufacturing an electrochemical device, wherein the electrochemical device comprises at least one solid-state glass-ceramic electrolyte and a battery with a metal and at least one electrode.

2. The method of claim 1, further comprising the step of:
   melting the solid-state glass-ceramic electrolyte on a metal surface, wherein the metal surface is a metal foil, wherein the metal foil does not adhere to the solid-state glass-ceramic electrolyte.

3. The method of claim 1, further comprising the step of:
   separating, by peeling off, a metal foil after compression of a metal foil to the solid-state glass-ceramic electrolyte and the metal foil.

4. The method of claim 1, further comprising the step of:
   melting, on a surface of a metal foil, at least one-inorganic precursors precursor of the solid-state glass-ceramic electrolyte.

5. The method of claim 2, wherein the solid-state glass-ceramic electrolyte comprises lithium undoped or doped antiperovskites and their polymorphs.

6. The method of claim 2, further comprising the step of:
   melting, on a surface of the metal foil in moisture-free inert atmosphere or in vacuum, at least one inorganic precursor for the solid-state glass-ceramic electrolyte.

7. The method of claim 2, further comprising the step of:
   melting, on a surface of the metal foil in a moisture free atmosphere, such as dry air, argon, helium, nitrogen, or in vacuum at least one solid-state glass-ceramic electrolyte inorganic precursor.

8. The method of claim 2, further comprising the step of:
   melting at least one inorganic precursor, directly on the metal foil and brought in direct contact with electrodes of the electrochemical device, such as aluminum-supported cathode or anode including copper-supported various graphite-, silicon-, or metal oxide- based nanocomposites.

9. The method of claim 2, further comprising the step of:
   bringing at least one inorganic precursor in direct contact with aluminum-supported cathode or copper-supported anode and compressing forming a fully integrated electrode-electrolyte multilayer architecture half-cell further used to construct a full cell.

10. The method of claim 2, further comprising the step of:
    heating at least one inorganic precursor on the metal foil; and
    cooling a fully integrated electrode-electrolyte architecture.

11. The method of claim 2, further comprising the step of:
    removing the metal foil from a fully integrated electrode-electrolyte architecture.

12. The method of claim 2, further comprising the step of:
   removal of the metal foil from a fully integrated electrode-electrolyte architecture with an electrolyte layer free of grain boundary morphology.

\* \* \* \* \*